United States Patent
Joshi et al.

(10) Patent No.: US 12,452,232 B2
(45) Date of Patent: *Oct. 21, 2025

(54) SYSTEM AND METHOD FOR USER AUTHENTICATION USING A STATIC AUTHENTICATION MATRIX

(71) Applicant: Bank of America Corporation, Charlotte, NC (US)

(72) Inventors: Ravi Joshi, Pennington, NJ (US); Anna Kristen Pingel Berry, Indian Land, SC (US); Olga Caroline Kocharyan, Matthews, NC (US); Luqman Abdul Hakeem Sharief, Libertyville, IL (US); Shweta Ambulkar, Plainsboro, NJ (US); Angela F. Ianni, Lincoln, RI (US); Michael William Whitaker, Fort Worth, TX (US); Benjamin Daniel Hardman, Harrisburg, NC (US)

(73) Assignee: Bank of America Corporation, Charlotte, NC (US)

( * ) Notice: Subject to any disclaimer, the term of this patent is extended or adjusted under 35 U.S.C. 154(b) by 157 days.

This patent is subject to a terminal disclaimer.

(21) Appl. No.: 18/484,376

(22) Filed: Oct. 10, 2023

(65) Prior Publication Data

US 2025/0119423 A1    Apr. 10, 2025

(51) Int. Cl.
   *H04L 9/40*    (2022.01)
(52) U.S. Cl.
   CPC .................................. *H04L 63/083* (2013.01)

(58) Field of Classification Search
   CPC ..................................................... H04L 63/083
   See application file for complete search history.

(56) References Cited

U.S. PATENT DOCUMENTS

| | | | |
|---|---|---|---|
| 8,689,310 B2 | 4/2014 | Taveau et al. |
| 8,813,219 B2 | 8/2014 | Natividad |
| 8,869,303 B2 | 10/2014 | Fleysher |
| 8,984,599 B2 | 3/2015 | Bodavula |
| 9,407,632 B2 | 8/2016 | Agarwal |
| 9,519,764 B2 | 12/2016 | Smales |

(Continued)

OTHER PUBLICATIONS

Ravi Joshi, et al.; "System and method for user authentication using a spinning authentication matrix," U.S. Appl. No. 18/484,400, filed Oct. 10, 2023.

*Primary Examiner* — Chau Le

(57) ABSTRACT

A method includes receiving a hash of a static password and a hash of a lot-one authentication string from a user device of a user. After an initial validation, an authentication matrix is generated. A block selection process is performed to select spurious and authentication blocks from the authentication matrix. The authentication blocks are selected based on a lot-two authentication string associated with the lot-one authentication string. In response to determining that the spurious and authentication blocks are selected according to a block selection sequence stored in a user profile of the user, a dynamic password is generated by combining the static password, the lot-one authentication string, and the authentication blocks. A hash of the dynamic password is generated. In response to determining that the hash of the dynamic password matches a hash of a dynamic password that is stored in the user profile, the user is authenticated.

20 Claims, 10 Drawing Sheets

(56) References Cited

U.S. PATENT DOCUMENTS

| | | | |
|---|---|---|---|
| 9,524,395 | B2 | 12/2016 | Selander et al. |
| 9,684,780 | B2 | 6/2017 | Liu et al. |
| 9,722,996 | B1 | 8/2017 | Kolman et al. |
| 10,187,211 | B2 | 1/2019 | Joyce, III |
| 10,395,065 | B2 | 8/2019 | Kong et al. |
| 10,498,541 | B2 | 12/2019 | Ebrahimi et al. |
| 11,019,048 | B2 | 5/2021 | Callaghan |
| 11,451,544 | B2 | 9/2022 | Hall |
| 11,468,157 | B2 * | 10/2022 | Guionneau ............ H04L 9/3226 |
| 11,665,006 | B2 | 5/2023 | Melo et al. |
| 11,671,267 | B2 | 6/2023 | Sundaresan et al. |
| 2017/0279795 | A1 | 9/2017 | Redberg |
| 2019/0182042 | A1* | 6/2019 | Ebrahimi .............. H04L 9/3234 |
| 2020/0382491 | A1* | 12/2020 | Kursun ............... H04L 63/1425 |
| 2021/0067501 | A1* | 3/2021 | Kurian ................. H04L 63/083 |
| 2021/0152538 | A1* | 5/2021 | Kurian ................. H04L 63/105 |
| 2022/0058655 | A1* | 2/2022 | Spencer ................ H04L 9/0869 |
| 2025/0117463 | A1* | 4/2025 | Joshi ....................... G06F 21/31 |

* cited by examiner

SYSTEM AND METHOD FOR USER AUTHENTICATION USING A STATIC AUTHENTICATION MATRIX

TECHNICAL FIELD

The present disclosure relates generally to user authentication, and more specifically to a system and method for user authentication using a static authentication matrix.

BACKGROUND

Various authentication standards (such as based on one-time passwords (OTPs), software tokens, biometric information, challenge questions, multi-factor authentication, etc.) are used to authenticate users. A malicious user may install various malwares (e.g., a keystroke logging malware or a screen capturing malware) on a device of a user to obtain authentication credentials of the user.

SUMMARY

The system described in the present disclosure provides several practical applications and technical advantages that overcome the current technical problems with user authentication.

In general, a system for user authentication using an authentication matrix includes an authentication management system communicatively coupled to a user device of a user and a service provider system via a network. The service provider system may comprise a data storage system, a web server, a cloud computing system that hosts micro applications, or any other computing system that is configured to provide desired services to users. The user may possess authentication credentials, such as a static password, one or more lot-one authentication strings, one or more lot-two authentication strings associated with each lot-one authentication strings, a block selection sequence, single-use codes, and special block codes. The authentication management system stores a user profile of the user. In other words, for each lot-one authentication string there exists one or more lot-two authentication strings. The user profile of the user may include a static password, a hash of the static password, one or more lot-one authentication strings, one or more hashes of the one or more lot-one authentication strings, one or more lot-two authentication strings associated with the one or more lot-one authentication strings, one or more hashes of the one or more lot-two authentication strings, a block selection sequence, dynamic password hashes, single-use codes, and special block codes.

The authentication management system receives a hash of the static password and a hash of a first lot-one authentication string from the user device of the user. The first lot-one authentication string may be any of the lot-one authentication strings of the user. The authentication management system performs a preliminary validation of the user based at least in part upon the hash of the static password and the hash of the first lot-one authentication string. Upon validation of the user, the authentication management system generates an authentication matrix including a plurality of blocks arranged in a plurality of rows and a plurality of columns. The plurality of rows include a plurality of row labels, and the plurality of columns include a plurality of column labels.

In certain embodiments, upon receiving instructions from the user device of the user, the authentication management system performs a block selection process to select a plurality of spurious blocks, a plurality of authentication blocks, and a special block from the authentication matrix. The spurious blocks and the authentication blocks may include any desired number of blocks based on a desired security level of the authentication process. The spurious blocks and the authentication blocks are selected according to the block selection sequence of the user. In certain embodiments when the spurious blocks include 6 blocks and the authentication blocks include 4 blocks, the block selection sequence may include a sequence of "spurious block, spurious block, authentication block, spurious block, spurious block, authentication block, spurious block, spurious block, authentication block, authentication block." Each spurious block is selected at random from the blocks of the authentication matrix. Each authentication block is selected according to a first lot-two authentication string associated with the first lot-one authentication string of the user. The first lot-two authentication string may be any of the lot-two authentication strings associated with the first lot-one authentication string. In certain embodiments when the authentication blocks include 4 blocks and the first lot-two authentication string is a 4-digit alphanumeric string, the first authentication block is a block of the authentication matrix that has a row label equal to a first digit of the first lot-two authentication string and a column label equal to a second digit of the first lot-two authentication string, the second authentication block is a block of the authentication matrix that has a row label equal to the second digit of the first lot-two authentication string and a column label equal to a third digit of the first lot-two authentication string, the third authentication block is a block of the authentication matrix that has a row label equal to the third digit of the first lot-two authentication string and a column label equal to a fourth digit of the first lot-two authentication string, the fourth authentication block is a block of the authentication matrix that has a row label equal to the fourth digit of the first lot-two authentication string and a column label equal to the first digit of the first lot-two authentication string. The special block may indicate that the user is using a public device, the user is using a private device, or that an authentication confirmation is needed for the user. In certain embodiments, the selection process of the special block may be omitted.

While performing the block selection process, the user may not remember one or more lot-two authentication strings. The device user may instruct the authentication management system to select a set of the blocks from the authentication matrix, where the set of the blocks are selected according to a single-use code of the user. In response to determining that the set of the blocks are selected according to a single-use code that is stored in the user profile of the user, the authentication management system determines that the user forgot one or more lot-two authentication strings, discards all lot-two authentication strings for the user, generates new lot-two authentication strings for the user, and sends the new lot-two authentication strings to the user. While performing the block selection process, the authentication management system may determine that the first lot-two authentication string was used by the user during a previous authentication process. In response to determining that the first lot-two authentication strings was used by the user during the previous authentication process, the authentication management system may perform a matrix spinning operation. The matrix spinning operation includes generating a new authentication matrix and replacing the current authentication matrix with the new authentication matrix, such that subsequent spurious and authentication blocks are selected from blocks of the new authentication matrix. The matrix spinning operation may be performed one or more times during the block selection process.

In certain embodiments, the matrix spinning operation may be done once. The matrix spinning operation may be done after selecting any of the authentication blocks. For example, the matrix spinning operation may be done after selecting the second authentication block form a first authentication matrix. In such example, the first spurious block, the second spurious block, the third spurious block, the fourth spurious block, the first authentication block and the second authentication block are selected from a first authentication matrix and the fifth spurious block, the sixth spurious block, the third authentication block, the fourth authentication block and the special block are selected from a second authentication matrix. Furthermore, the third authentication block and the fourth authentication block are selected based on a second lot-two authentication string that is associated with the first lot-one authentication strings of the user. The second lot-two authentication string may be any of the lot-two authentication strings associated with the first lot-one authentication string that is different from the first lot-two authentication string. In certain embodiments when the second lot-two authentication string is a 4-digit alphanumeric string, the third authentication block is a block of the second authentication matrix that has a row label equal to a third digit of the second lot-two authentication strings and a column label equal to a fourth digit of the second lot-two authentication strings, and the fourth authentication block is a block of the second authentication matrix that has a row label equal to the fourth digit of the second lot-two authentication strings and a column label equal to a first digit of the second lot-two authentication strings.

In other embodiments, the matrix spinning operation may be done more than once. For example, the first matrix spinning operation may be done after selecting the second authentication block and the second matrix spinning process is done after selecting the third authentication block. In such example, the first spurious block, the second spurious block, the third spurious block, the fourth spurious block, the first authentication block and the second authentication block are selected from a first authentication matrix, the fifth spurious block, the sixth spurious block and the third authentication block are selected from a second authentication matrix, and the fourth authentication block and the special block are selected from a third authentication matrix. Furthermore, the third authentication block is selected based on a second lot-two authentication string that is associated with the first lot-one authentication string and the fourth authentication block is selected based on a third lot-two authentication string that is associated with the first lot-one authentication string. The second lot-two authentication string may be any of the lot-two authentication strings associated with the first lot-one authentication string that is different from the first lot-two authentication string. The third lot-two authentication string may be any of the lot-two authentication strings associated with the first lot-one authentication string that is different from the first lot-two authentication string and the second lot-two authentication string. In certain embodiments when the second lot-two authentication string and the third lot-two authentication string are 4-digit alphanumeric strings, the third authentication block is a block of the second authentication matrix that has a row label equal to a third digit of the second lot-two authentication string and a column label equal to a fourth digit of the second lot-two authentication string and the fourth authentication block is a block of the third authentication matrix that has a row label equal to a fourth digit of the third lot-two authentication string and a column label equal to a first digit of the third lot-two authentication string.

After selecting the spurious blocks and the authentication blocks, in response to determining that the spurious blocks and the authentication blocks are selected according to a block selection sequence that is stored in the user profile of the user, the authentication management system generates a dynamic password by combining the static password, the first lot-one authentication string and the authentication blocks, and generates a hash of the dynamic password. In response to determining that the hash of the dynamic password matches a dynamic password hash stored in the user profile of the user, the authentication management system authenticates the user.

In certain embodiments when the special block is selected, the authentication management system analyzes the special block. In response to determining that the special block indicates that the user is using a public device, the authentication management system discards lot-two authentication strings of the user that are used in the current authentication process, generates new lot-two authentication strings for the user, and sends the new lot-two authentication strings to the user. In response to determining that the special block indicates that the authentication confirmation is needed for the user, the authentication management system performs the authentication confirmation for the user using a non-custodial wallet, for example.

The present disclosure provides various advantages. The authentication management system allows for improving authentication security of users. By using an authentication matrix to select spurious and authentication blocks a malicious user may fail to distinguish between authentication blocks and the spurious blocks and to obtain full authentication information of the user (such as, for example, one or more lot-two authentication strings) even if a keystroke logging malware or a screen capturing malware is installed on the user device by the malicious user. Furthermore, by employing one or more matrix spinning operations, the authentication security of users is further improved, since the malicious user may fail to correlate selected blocks with one or more lot-two authentication strings used for selecting the spurious and authentication blocks and to identify the one or more lot-two authentication strings used during the block selection process. By improving the authentication security of users, network security of underlying computing systems is also improved. Accordingly, the following disclosure is particularly integrated into practical applications of: (1) improving authentication security of users; and (2) improving network security of computing systems.

In one embodiment, a system includes a memory and a processor communicatively coupled to the memory. The memory is configured to store a first user profile for a first user. The first user profile includes a first static password associated with the first user, one or more lot-one authentication strings associated with the first user, one or more lot-two authentication strings associated with each lot-one authentication string of the first user, a first block selection sequence associated with the first user, and hashes of dynamic passwords. Each lot-one authentication string of the first user comprises a multi-digit alphanumeric string. Each lot-two authentication string of the first user comprises a multi-digit alphanumeric string. The first block selection sequence is a sequence according to which the first user is supposed to select one or more authentication blocks and one or more spurious blocks from an authentication matrix.

The one or more authentication blocks are selected based on a lot-two authentication string of the first user. Each dynamic password comprises a combination of the first static password, a respective lot-one authentication string of the first user, and one or more authentication blocks selected based on a respective lot-two authentication string associated with the respective lot-one authentication string of the first user. The processor is configured to receive a hash of the first static password and a hash of a first lot-one authentication string from a first user device of the first user and perform an initial validation of the first user based at least in part upon the hash of the first static password and the hash of the first lot-one authentication string. In response to determining that the first user is validated, the processor is further configured to generate a first authentication matrix. The first authentication matrix includes a first plurality of blocks arranged in a first plurality of rows and a first plurality of columns. The first plurality of rows include a first plurality of row labels and the first plurality of columns include a first plurality of column labels. The processor is further configured to perform a first block selection process to select a first plurality of spurious blocks and a first plurality of authentication blocks from the first authentication matrix. Performing the first block selection process includes selecting a first spurious block from the first authentication matrix, selecting a second spurious block from the first authentication matrix, selecting a first authentication block from the first authentication matrix based on a first digit and a second digit of a first lot-two authentication string associated with the first lot-one authentication string, selecting a third spurious block from the first authentication matrix, selecting a fourth spurious block from the first authentication matrix, selecting a second authentication block from the first authentication matrix based on the second digit and a third digit of the first lot-two authentication string, selecting a fifth spurious block from the first authentication matrix, selecting a sixth spurious block from the first authentication matrix, selecting a third authentication block from the first authentication matrix based on the third digit and a fourth digit of the first lot-two authentication string, and selecting a fourth authentication block from the first authentication matrix based on the first digit and the fourth digit of the first lot-two authentication string. The first authentication block is a block of the first authentication matrix with a row label equal to the first digit of the first lot-two authentication string and a column label equal to the second digit of the first lot-two authentication string. The second authentication block is a block of the first authentication matrix with a row label equal to the second digit of the first lot-two authentication string and a column label equal to the third digit of the first lot-two authentication string. The third authentication block is a block of the first authentication matrix with a row label equal to the third digit of the first lot-two authentication string and a column label equal to the fourth digit of the first lot-two authentication string. The fourth authentication block is a block of the first authentication matrix with a row label equal to the fourth digit of the first lot-two authentication string and a column label equal to the first digit of the first lot-two authentication string. The processor is further configured to determine if the first plurality of spurious blocks and the first plurality of authentication blocks are selected according to the first block selection sequence associated with the first user. In response to determining that the first plurality of spurious blocks and the first plurality of authentication blocks are selected according to the first block selection sequence associated with the first user, the processor is further configured to generate a first dynamic password by combining the first static password, the first lot-one authentication string and the first plurality of authentication blocks, generate a hash of the first dynamic password, and in response to determining that the hash of the first dynamic password matches a hash of a dynamic password that is stored in the first user profile of the first user, authenticate the first user.

In another embodiment, a system includes a memory and a processor communicatively coupled to the memory. The memory is configured to store a first user profile for a first user. The first user profile includes a first static password associated with the first user, one or more lot-one authentication strings associated with the first user, one or more lot-two authentication strings associated with each lot-one authentication string of the first user, a first block selection sequence associated with the first user, and hashes of dynamic passwords. Each lot-one authentication string of the first user includes a multi-digit alphanumeric string. Each lot-two authentication string of the first user includes a multi-digit alphanumeric string. The first block selection sequence is a sequence according to which the first user is supposed to select one or more authentication blocks and one or more spurious blocks from one or more authentication matrices. The one or more authentication blocks are selected based on a lot-two authentication string of the first user. Each dynamic password includes a combination of the first static password, a respective lot-one authentication string of the first user, and one or more authentication blocks selected based on a respective lot-two authentication string associated with the respective lot-one authentication string of the first user. The processor is configured to receive a hash of the first static password and a hash of a first lot-one authentication string from a first user device of the first user and perform an initial validation of the first user based at least in part upon the hash of the first static password and the hash of the first lot-one authentication string. In response to determining that the first user is validated, the processor is further configured to generate a first authentication matrix. The first authentication matrix includes a first plurality of blocks arranged in a first plurality of rows and a first plurality of columns. The first plurality of rows include a first plurality of row labels and the first plurality of columns include a first plurality of column labels. The processor is further configured to perform a first block selection process to select a first plurality of spurious blocks and a first plurality of authentication blocks. Performing the first block selection process includes selecting a first spurious block from the first authentication matrix, selecting a second spurious block from the first authentication matrix, selecting a first authentication block from the first authentication matrix based on a first digit and a second digit of a first lot-two authentication string associated with the first lot-one authentication string, selecting a third spurious block from the first authentication matrix, selecting a fourth spurious block from the first authentication matrix, selecting a second authentication block from the first authentication matrix based on the second digit and a third digit of the first lot-two authentication string, and determining if the first lot-two authentication string was used by the first user in a previous authentication session. The first authentication block is a block of the first authentication matrix with a row label equal to the first digit of the first lot-two authentication string and a column label equal to the second digit of the first lot-two authentication string. The second authentication block is a block of the first authentication matrix with a row label equal to the second digit of the first lot-two authentication string and a column label equal to the third digit of the first lot-two authentication string. In response to determining that the first lot-two authentication string was used by the first user in the previous authentication session, performing the first block selection process further includes generating a second authentication matrix and replacing the first authentication matrix with the second authentication matrix. The second authentication matrix includes a second plurality of blocks arranged in a second plurality of rows and a second plurality of columns. The second plurality of rows include a second plurality of row labels and the second plurality of columns include a second plurality of column labels. Performing the first block selection process further includes selecting a first spurious block from the second authentication matrix, selecting a second spurious block from the second authentication matrix, selecting a first authentication block from the second authentication matrix based on a third digit and a fourth digit of a second lot-two authentication string associated with the first lot-one authentication string, and selecting a second authentication block from the second authentication matrix based on a first digit and the fourth digit of the second lot-two authentication string. The first authentication block of the second authentication matrix is a block of the second authentication matrix with a row label equal to the third digit of the second lot-two authentication string and a column label equal to the fourth digit of the second lot-two authentication string. The second authentication block of the second authentication matrix is a block of the second authentication matrix with a row label equal to the fourth digit of the second lot-two authentication string and a column label equal to the first digit of the second lot-two authentication string. The processor is further configured to determine if the first plurality of spurious blocks and the first plurality of authentication blocks are selected according to the first block selection sequence associated with the first user. In response to determining that the first plurality of spurious blocks and the first plurality of authentication blocks are selected according to the first block selection sequence associated with the first user, the processor is further configured to generate a first dynamic password by combining the first static password, the first lot-one authentication string and the first plurality of authentication blocks, generate a hash of the first dynamic password, and in response to determining that the hash of the first dynamic password matches a hash of a dynamic password that is stored in the first user profile of the first user, authenticate the first user.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

As described above, previous technologies fail to provide efficient and reliable solutions for the user authentication. Embodiments of the present disclosure and its advantages may be understood by referring to FIGS. 1, 2A-2C, 3A-3C, 4, 5A, and 5B. FIGS. 1, 2A, 3A-3C, and 4 are used to describe a system and method for user authentication using a statis authentication matrix. FIGS. 1, 2B, 2C, 3A-3C, 5A, and 5B are used to describe a system and method for user authentication using a spinning authentication matrix.

System for User Authentication Using an Authentication Matrix

System Overview

Figure 1:
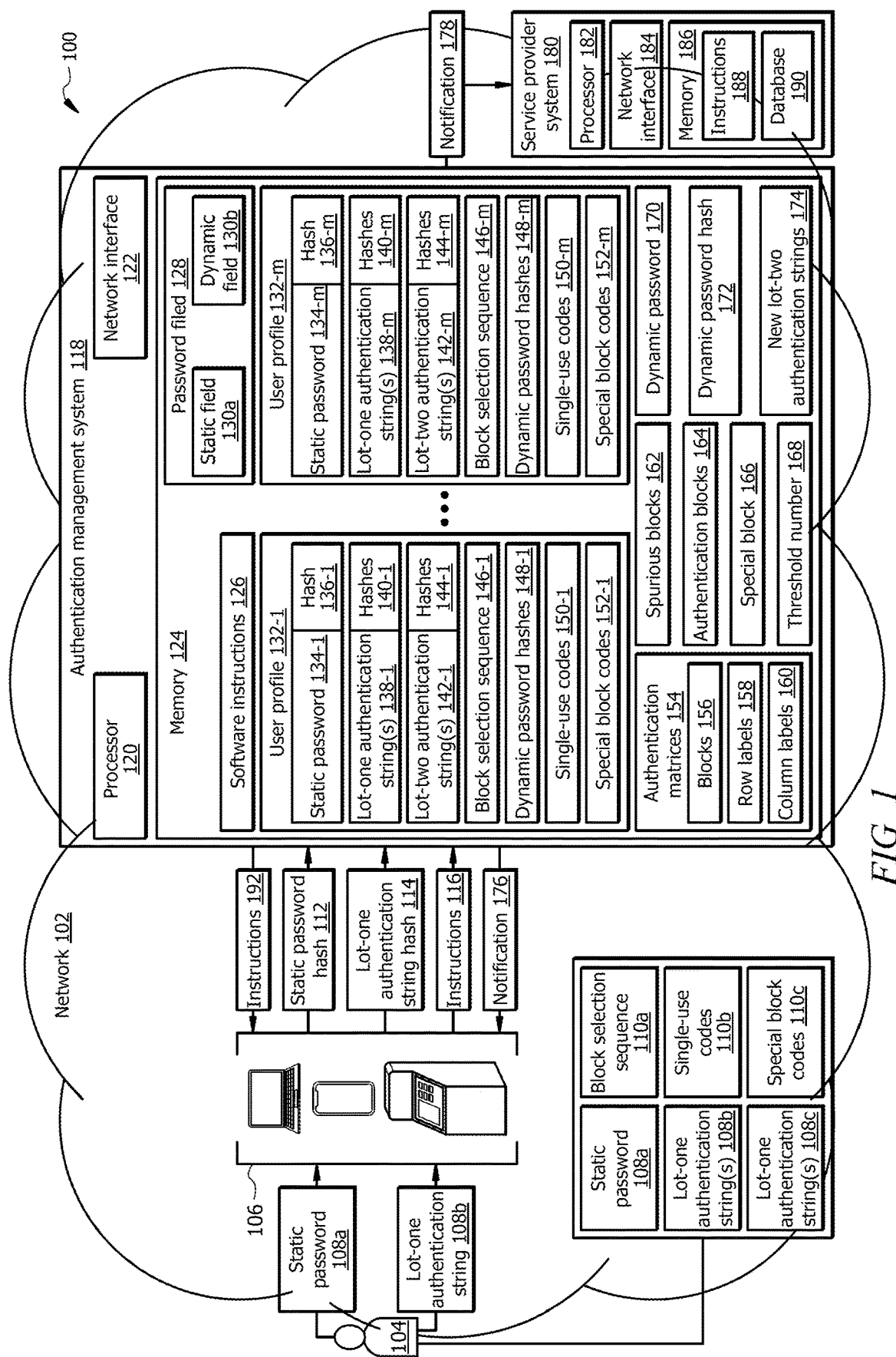
FIG. 1 illustrates an embodiment of a system configured for user authentication using an authentication matrix.

FIG. 1 illustrates an embodiment of a system 100 that is generally configured for user authentication using an authentication matrix. In certain embodiments, the system 100 comprises an authentication management system 118 that is operably coupled to one or more user devices 106 of one or more users 104 and a service provider system 180 via a network 102. Network 102 enables the communication between the components of the system 100. The service provider system 180 is configured to receive one or more requests from users and provide respective services to the users based on the requests. The service provider system 180 may comprise a data storage system, a web hosting system, a cloud computing system hosting micro application, or any other computing system configured to provide desired services to users. In other embodiments, the system 100 may not have all the components listed and/or may have other elements instead of, or in addition to, those listed above. For example, the authentication management system 118 may be integrated into the service provider system 180.

In general, the authentication management system 118 generates a password field 128 and sends instructions 192 to the user device 106 of the user 104 to display the password field 128. The password field 128 may comprise a static field 130a and a dynamic field 130b. The static field 130a is configured to receive a static password 108a from the user 104 and the dynamic field 130b is configured to receive a lot-one authentication string 108b from the user 104. The user 104 enters the static password 108a into the static field 130a and the lot-one authentication string 108b into the dynamic field 130b on the user device 106. In response, the user device 106 generates a hash 112 of the static password 108a and a hash 114 of the lot-one authentication string 108b and sends the hashes 112 and 114 to the authentication management system 118.

The authentication management system 118 receives the hash 112 of the static password 108a and the hash 114 of the lot-one authentication string 108b from the user device 106 and performs an initial validation of the user 104 based on at least in part upon the hashes 112 and 114. In response to the initial validation process being not successful, the authentication management system 118 does not authenticate the user 104, sends a notification 176 to the user device 106 that authentication is not successful, and sends a notification 178 to the service provider system 180 that authentication of the user 104 is not successful. In response to the initial validation process being successful, the authentication management system 118 generates an authentication matrix 154. The authentication matrix 154 comprises a plurality of blocks 156 arranged in a plurality of rows and a plurality of columns. The plurality of rows include a plurality of row labels 158 and the plurality of columns include a plurality of column labels 160.

The authentication management system 118 performs a block selection process to select a plurality of spurious blocks 162, a plurality of authentication blocks 164, and a special block 166 from one or more authentication matrices 154. In certain embodiments, the spurious blocks 162 and the authentication blocks 164 are selected according to a block selection sequence 110a, such that the authentication blocks 164 are selected based on one or more of lot-two authentication strings 108c that correspond to the lot-one authentication string 108b. The special block 166 is selected according to a special block code 110c after selecting the spurious blocks 162 and the authentication blocks 164. The special block 166 may indicate that the user 104 is using a private device, the user 104 is using a public device, or an authentication confirmation is needed for the user 104. In certain embodiments, the selection of the special block 166 may be omitted. The block selection process may be performed according to methods described in greater detail below with to reference to FIGS. 2A-2C.

In response to determining that the spurious blocks 162 and the authentication blocks 164 are selected according to a block selection sequence (e.g., respective one of block selection sequences 146-1 through 146-$m$) that is stored in the user profile (e.g., respective one of user profiles 132-1 through 132-$m$) stored in the authentication management system 118, the authentication management system 118 combines the static password 108a, the first lot-one authentication string 108b and the authentication blocks 164 to generate a dynamic password 170. After generating the dynamic password 170, the authentication management system 118 generates a hash 172 of the dynamic password 170 by applying a suitable hash function to the dynamic password 170.

The authentication management system 118 determines if the hash 172 matches a dynamic password hash (e.g., respective one of dynamic password hashes 148-1 through 148-$m$) that is stored in the user profile (e.g., respective one of user profiles 132-1 through 132-$m$) stored in the authentication management system 118. In response to determining that the hash 172 does not match the dynamic password hash (e.g., respective one of dynamic password hashes 148-1 through 148-$m$) that is stored in the user profile (e.g., respective one of user profiles 132-1 through 132-$m$) stored in the authentication management system 118, the authentication management system 118 does not authenticate the user 104, sends a notification 176 to the user device 106 of the user 104 that authentication is not successful, and sends a notification 178 to a service provider system 180 that the authentication process of the user 104 is not successful.

In response to determining that the hash 172 matches the dynamic password hash (e.g., respective one of dynamic password hashes 148-1 through 148-$m$) that is stored in the user profile (e.g., respective one of user profiles 132-1 through 132-$m$) stored in the authentication management system 118, the authentication management system 118 authenticates the user 104, sends a notification 176 to the user device 106 of the user 104 that the authentication process is successful, and sends a notification 178 to the service provider system 180 that the user 104 is successfully authenticated.

In certain embodiments when the user 104 forgets one or more of the lot-two authentication strings 108c, the spurious blocks 162 and the authentication blocks 164 are selected based on a single-use code 110b. In response to determining that the spurious blocks 162 and the authentication blocks 164 correspond to a single-use code (e.g., respective one of single-use code 150-1 through 150-$m$) that is stored in the user profile (e.g., respective one of user profiles 132-1 through 132-$m$) stored in the authentication management system 118, the authentication management system 118 determines that the user 104 forgot one or more of the lot-two authentication strings 108c, discards all of the lot-two authentication strings 108c, generates new lot-two authentication strings 174, stores the new lot-two authentication strings 174 in the user profile (e.g., respective one of user profiles 132-1 through 132-$m$ of FIG. 1) stored in the authentication management system 118, and sends the new lot-two authentication strings 174 to the user 104.

In certain embodiments, the authentication management system 118 determines if the special block 166 indicates that the user 104 is using a private device or a public device, or that an authentication confirmation is needed for the user 104. In response to determining that the user 104 is using the public device, the authentication management system 118 discards lot-two authentication strings (e.g., respective one of lot-two authentication strings 142-1 through 142-$m$) that are used in the current authentication session, generates new lot-two authentication strings 174, stores the new lot-two authentication strings 174 in the user profile (e.g., respective one of user profiles 132-1 through 132-$m$) stored in the authentication management system 118, and sends the new lot-two authentication strings 174 to the user 104. In response to determining that the authentication confirmation is needed for the user 104, the authentication management system 118 performs the authentication confirmation.

System Components

Network

Network 102 may be any suitable type of wireless and/or wired network. Network 102 may or may not be connected to the Internet or public network. Network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. Network 102 may be configured to support any suitable type of communication protocol as would be appreciated by one of ordinary skill in the art.

User Device

The user device 106 is generally any device that is configured to process data and interact with the user 104.

Examples of the user device 106 include, but are not limited to, a personal computer, a desktop computer, a workstation, a server, a laptop, a tablet computer, a mobile phone (such as a smartphone), a virtual reality headset, etc. The user device 106 may include a user interface, such as a display, a microphone, keypad, or other appropriate terminal equipment usable by the user 104. The user device 106 may include a hardware processor, memory, and/or circuitry (not explicitly shown) configured to perform any of the functions or actions of the user device 106 described herein. For example, software applications designed using software code may be stored in the memory and executed by the processor to perform the functions of the user device 106. The user device 106 is configured to communicate with other components of the system 100 via the network 102. In one embodiment, the user device 106 may include an automated teller machine (ATM).

The user 104 may possess user credentials that are used by the software instructions 188 to authenticate the user 104 and allow access to the service provider system 180. The user credentials may include a static password 108a, one or more lot-one authentication strings 108b, one or more lot-two authentication strings 108c corresponding to each of the one or more lot-one authentication strings 108b, a block selection sequence 110a, single-use codes 110b, and special block codes 110c.

The static password 108a, each of the one or more lot-one authentication strings 108b and each of the one or more lot-two authentication strings may comprise a multi-digit alphanumeric string. In certain embodiments, the static password 108a comprises an 8-digit or 8-character alphanumeric string, and each of the one or more lot-one authentication strings 108b and each of the one or more lot-two authentication strings comprises a 4-digit personal identification number (PIN) with each digit being an integer number in a range from 0 to 9.

The block selection sequence 110a comprises a sequence that the user 104 is supposed to use while selecting spurious blocks 162 and authentication blocks 164 from one or more authentication matrices 154. Each of the single-use codes 110b comprises information that identifies the spurious blocks 162 and the authentication blocks 164 in the authentication matrix 154 and may be used by the user 104 when the user 104 forgets the one or more lot-two authentication strings and is unable to select the spurious blocks 162 and the authentication blocks 164 according to the block selection sequence 110a. In certain embodiments, each of the single-use codes 110b comprises row and column labels for respective spurious and authentication blocks. Each of the special block codes 110c comprises information that identifies a special block 166 in the authentication matrix 154, such as row and column labels, for example. The special block 166 may indicate that the user 104 is using a private device, the user 104 is using a public device, or an authentication confirmation is needed for the user 104.

Figure 2A:
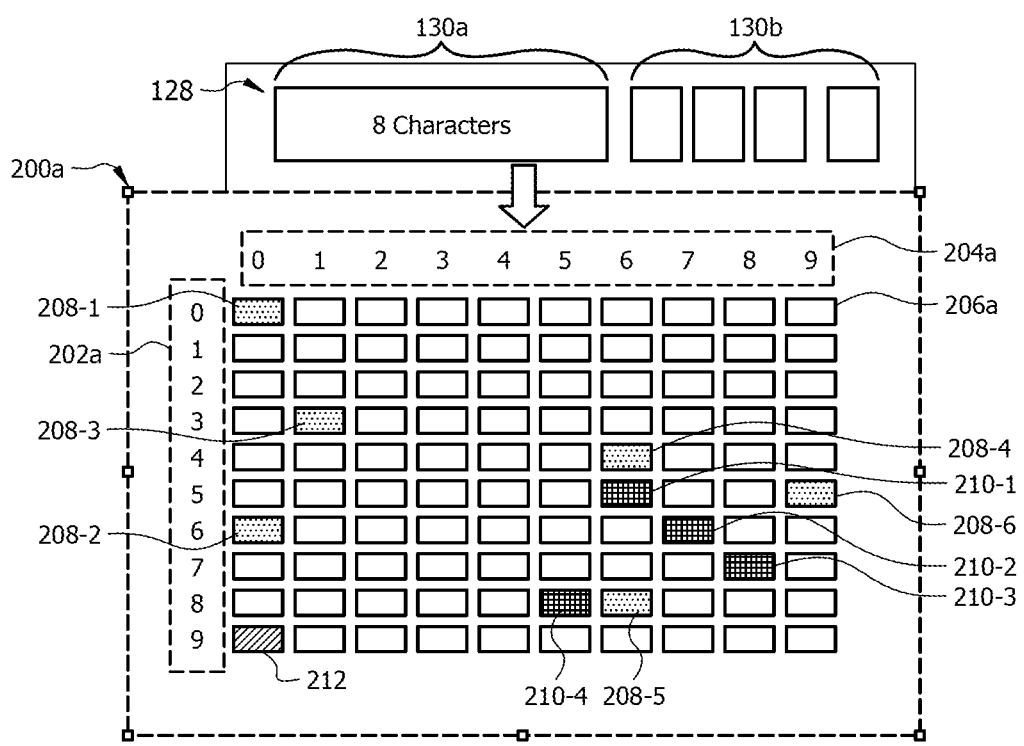
FIG. 2A illustrates an example block selection process for a static authentication matrix.

In operation, the user device 106 receives from the authentication management system 118 instructions 192 to display a password field 128. The password field 128 may comprise a static field 130a and a dynamic field 130b. The static field 130a is configured to receive the static password 108a from the user 104 and the dynamic field 130b is configured to receive a lot-one authentication string 108b from the user 104. Each of the static field 130a and the dynamic field 130b may be a multi-digit or a multi-character field. For example, FIG. 2A illustrates an 8-digit static field 130a and a 4-digit dynamic field 130b. In the illustrated embodiment, the static field 130a is positioned on the left side of the dynamic field 130b. In other embodiments, the static field 130a may be positioned on the right side of the dynamic field 130b. In yet other embodiments, digits of the dynamic field 130b may be positioned between digits of the static field 130a in any desired combination. The user 104 enters the static password 108a into the static field 130a and the lot-one authentication string 108b into the dynamic field 130b on the user device 106. In response, the user device 106 generates a hash 112 of the static password 108a and a hash 114 of the lot-one authentication string 108b and sends the hashes 112 and 114 to the authentication management system 118.

The user device 106 is further configured to send various instructions 116 to the authentication management system 118 in response to instructions received from the user 104. In certain embodiments, the instructions 116 may include instructions to select the spurious blocks 162 and the authentication blocks 164 according to the block selection sequence 110a, instructions to select the spurious blocks 162 and the authentication blocks 164 according to a single-use code 110b, and instructions to select a special block 166 according to the special block code 110c. The user device 106 is further configured to receive a notification 176 indicating whether authentication was successful or not successful. When the notification 176 indicates that authentication of the user 104 is successful, the user device 106 gains access to the service provider system 180.

Authentication Management System

The authentication management system 118 is generally any device that is configured to process data and communicate with other components of the system 100 via the network 102. The authentication management system 118 may comprise a processor 120 in signal communication with a memory 124 and a network interface 122.

Processor 120 comprises one or more processors operably coupled to the memory 124. Processor 120 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 120 may be a programmable logic device, a microcontroller, a microprocessor, or any suitable combination of the preceding. The one or more processors are configured to process data and may be implemented in hardware or software. For example, processor 120 may be 8-bit, 16-bit, 32-bit, 64-bit, or of any other suitable architecture. The one or more processors are configured to implement various software instructions to perform the operations described herein. For example, the one or more processors are configured to execute software instructions 126 and perform one or more functions described herein.

Network interface 122 is configured to enable wired and/or wireless communications (e.g., via network 102). Network interface 122 is configured to communicate data between the authentication management system 118 and other components of the system 100. For example, network interface 122 may comprise a WIFI interface, a local area network (LAN) interface, a wide area network (WAN) interface, a modem, a switch, or a router. Processor 120 is configured to send and receive data using network interface 122. Network interface 122 may be configured to use any suitable type of communication protocol as would be appreciated by one of ordinary skill in the art.

Memory 124 comprises a non-transitory computer-readable medium such as one or more disks, tape drives, or solid-state drives, and may be used as an over-flow data storage device, to store programs when such programs are selected for execution, and to store instructions and data that are read during program execution. Memory 124 may be volatile or non-volatile and may comprise a read-only memory (ROM), random-access memory (RAM), ternary content-addressable memory (TCAM), dynamic random-access memory (DRAM), and static random-access memory (SRAM). Memory 124 may be implemented using one or more disks, tape drives, solid-state drives, and/or the like. Memory 124 may store any of the information described in FIGS. 1, 2A-2C, 3A-3C, 4, 5A, and 5B along with any other data, instructions, logic, rules, or code operable to implement the function(s) described herein. Memory 124 is operable to store software instructions 126 and/or any other data and instructions. Software instructions 126 may comprise any suitable set of software instructions, logic, rules, or code operable to be executed by processor 120.

Memory 124 may further store a plurality of user profiles 132-1 through 132-$m$. Each of the user profiles 132-1 through 132-$m$ comprises user credentials associated with respective users. The user profile 132-1 (132-$m$) comprises a static password 134-1 (134-$m$), a hash 136-1 (136-$m$) of the static password 134-1 (134-$m$), one or more lot-one authentication strings 138-1 (138-$m$), one or more hashes 140-1 (140-$m$) of the one or more lot-one authentication strings 138-1 (138-$m$), one or more lot-two authentication strings 142-1 (142-$m$), one or more hashes 144-1 (144-$m$) of the one or more lot-two authentication strings 142-1 (142-$m$), a block selection sequence 146-1 (146-$m$), dynamic password hashes 148-1 (148-$m$), single-use codes 150-1 (150-$m$), and special block codes 152-1 (152-$m$).

The static passwords 134-1 through 134-$m$, the lot-one authentication strings 138-1 through 138-$m$ and the lot-two authentication strings 142-1 through 142-$m$ may comprise multi-digit alphanumeric strings. In certain embodiments, the static passwords 134-1 through 134-$m$ may comprise 8-digit or 8-character alphanumeric strings, and the lot-one authentication strings 138-1 through 138-$m$ and the lot-two authentication strings 142-1 through 142-$m$ may comprise 4-digit personal identification numbers (PINs) with each digit being an integer number in a range from 0 to 9. The block selection sequences 146-1 through 146-$m$ comprise sequences that the respective users are supposed to use while selecting spurious blocks 162 and authentication blocks 164 from one or more authentication matrices 154. The single-use codes 150-1 through 150-$m$ comprise information that identifies the spurious blocks 162 and the authentication blocks 164 and may be used by the respective users when the users forget the one or more lot-two authentication strings 142-1 through 142-$m$ and are unable to select the spurious blocks 162 and the authentication blocks 164 according to the block selection sequences 146-1 through 146-$m$. In certain embodiments, each of the single-use codes 150-1 through 150-$m$ comprises row and column labels for respective spurious and authentication blocks. Each of the special block codes 152-1 through 152-$m$ comprises information that identifies a special block 166 in the authentication matrix 154, such as row and column labels, for example. The special block 166 may indicate that a respective user is using a private device, the respective user is using a public device, or an authentication confirmation is needed for the respective user. The dynamic password hashes 148-1 through 148-$m$ comprise hashes of respective dynamic passwords, where each dynamic password comprises a combination of the static password 108$a$, the lot-one authentication string 108$b$ and respective authentication blocks 164.

In operation, the processor 120 of the authentication management system 118 generates a password field 128 and sends instructions 192 to the user device 106 of the user 104 to display the password field 128. In response, the processor 120 of the authentication management system 118 receives a hash 112 of a static password 108$a$ and a hash 114 of a lot-one authentication string 108$b$ from the user device 106 of the user 104. The processor 120 of the authentication management system 118 performs an initial validation of the user 104 based on at least in part upon the hashes 112 and 114. In response to the initial validation process being not successful, the processor 120 of the authentication management system 118 does not authenticate the user 104, sends a notification 176 to the user device 106 that authentication is not successful, and sends a notification 178 to a service provider system 180 that authentication of the user 104 is not successful.

In response to the initial validation process being successful, the processor 120 of the authentication management system 118 generates an authentication matrix 154. The authentication matrix 154 comprises a plurality of blocks 156 arranged in a plurality of rows and a plurality of columns. The plurality of rows include a plurality of row labels 158 and the plurality of columns include a plurality of column labels 160. The row labels 158 and the column labels 160 comprise alphanumeric characters. In certain embodiments, the authentication matrix 154 may be a 10-by-10 matrix having 10 rows, 10 columns, and 100 blocks. In such embodiments, the row labels 158 and the column labels 160 may comprise a sequence of integer numbers in a range from 0 to 9. Each block 156 of the authentication matrix 154 may comprise a multi-digit alphanumeric character, such as a 9-digit alphanumeric character, for example.

The processor 120 of the authentication management system 118 performs a block selection process to select a plurality of spurious blocks 162, a plurality of authentication blocks 164, and a special block 166 from one or more authentication matrices 154. In certain embodiments, the plurality of spurious blocks 162 and the plurality of authentication blocks 164 are selected according to a block selection sequence 110$a$, such that the plurality of authentication blocks 164 are selected based on one or more of the lot-two authentication strings 108$c$ that correspond to the lot-one authentication string 108$b$. The special block 166 is selected according to the special block code 110$c$ after selecting the plurality of spurious blocks 162 and the plurality of authentication blocks 164. The special block 166 may indicate that the user 104 is using a private device, the user 104 is using a public device, or an authentication confirmation is needed for the user 104. In certain embodiments, the selection of the special block 166 may be omitted. The block selection process may be performed according to methods described below in greater detail with to reference to FIGS. 2A-2C.

In response to determining that the spurious blocks 162 and the authentication blocks 164 are selected according to a block selection sequence (e.g., respective one of block selection sequences 146-1 through 146-$m$) that is stored in the user profile (e.g., respective one of user profiles 132-1 through 132-$m$) stored in the memory 124 of the authentication management system 118, the processor 120 of the authentication management system 118 combines the static password 108$a$, the first lot-one authentication string 108$b$ and the authentication blocks 164 to generate a dynamic password 170. In certain embodiments, combining the static password 108$a$, the first lot-one authentication string 108$b$ and the authentication blocks 164 comprises concatenating strings of the static password 108a, the first lot-one authentication string 108b and the authentication blocks 164. After generating the dynamic password 170, the processor 120 of the authentication management system 118 generates a hash 172 of the dynamic password 170 by applying a suitable hash function to the dynamic password 170.

The processor 120 of the authentication management system 118 determines if the hash 172 matches a dynamic password hash (e.g., respective one of dynamic password hashes 148-1 through 148-m) that is stored in the user profile (e.g., respective one of user profiles 132-1 through 132-m) stored in the memory 124 of the authentication management system 118. In response to determining that the hash 172 does not match the dynamic password hash (e.g., respective one of dynamic password hashes 148-1 through 148-m) that is stored in the user profile (e.g., respective one of user profiles 132-1 through 132-m) stored in the memory 124 of the authentication management system 118, the processor 120 of the authentication management system 118 does not authenticate the user 104, sends a notification 176 to the user device 106 of the user 104 that authentication is not successful, and sends a notification 178 to a service provider system 180 that the authentication process of the user 104 is not successful.

In response to determining at that the hash 172 matches the dynamic password hash (e.g., respective one of dynamic password hashes 148-1 through 148-m) that is stored in the user profile (e.g., respective one of user profiles 132-1 through 132-m) stored in the memory 124 of the authentication management system 118, the processor 120 of the authentication management system 118 authenticates the user 104, sends a notification 176 to the user device 106 of the user 104 that the authentication process is successful, and sends a notification 178 to the service provider system 180 that the user 104 is successfully authenticated.

In certain embodiments when the user 104 forgets one or more of the lot-two authentication strings 108c, the spurious blocks 162 and the authentication blocks 164 are selected based on a single-use code 110b. The single-use code 110b comprises information for identifying the spurious blocks 162 and the authentication blocks 164 in one or more authentication matrices 154. In certain embodiments, the single-use code 110b comprises row and column labels for each of the spurious blocks 162 and each of authentication blocks 164. In response to determining that the spurious blocks 162 and the authentication blocks 164 correspond to a single-use code (e.g., respective one of single-use code 150-1 through 150-m) that is stored in the user profile (e.g., respective one of user profiles 132-1 through 132-m) stored in the memory 124 of the authentication management system 118, the processor 120 of the authentication management system 118 determines that the user 104 forgot one or more of the lot-two authentication strings 108c. The processor 120 of the authentication management system 118 discards all of the lot-two authentication strings 108c, generates new lot-two authentication strings 174, stores the new lot-two authentication strings 174 in the user profile (e.g., respective one of user profiles 132-1 through 132-m) stored in the memory 124 of the authentication management system 118, and sends the new lot-two authentication strings 174 to the user 104. In certain embodiments, the processor 120 of the authentication management system 118 sends the new lot-two authentication strings 174 to the user device 106 of the user 104 using an electronic mail.

In certain embodiments, the processor 120 of the authentication management system 118 determines if the special block 166 indicates that the user 104 is using a private device or a public device, or that an authentication confirmation is needed for the user 104. In response to determining that the user 104 is using the public device, the processor 120 of the authentication management system 118 discards lot-two authentication strings (e.g., respective one of lot-two authentication strings 142-1 through 142-m) that are used in the current authentication session, generates new lot-two authentication strings 174, stores the new lot-two authentication strings 174 in the user profile (e.g., respective one of user profiles 132-1 through 132-m) stored in the memory 124 of the authentication management system 118, and sends the new lot-two authentication strings 174 to the user 104. In certain embodiments, the processor 120 of the authentication management system 118 sends the new lot-two authentication strings 174 to the user device 106 of the user 104 using an electronic mail. In response to determining that the authentication confirmation is needed for the user 104, the processor 120 of the authentication management system 118 performs the authentication confirmation. In certain embodiments, the authentication confirmation is performed using a non-custodial wallet.

FIG. 2A illustrates an example block selection process for a static authentication matrix. In certain embodiments, the block selection process includes selecting a plurality of spurious blocks 208-1 through 208-6, a plurality of authentication blocks 210-1 through 210-4, and a special block 212 from a plurality of blocks 206a of an authentication matrix 200a. Since all spurious blocks 208-1 through 208-6 and all authentication blocks 210-1 through 210-4 are selected from the same authentication matrix 200a, the authentication matrix 200a may be also referred to as a static authentication matrix. In the illustrated embodiment, the authentication matrix 200a is a 10-by-10 matrix comprising the plurality of blocks 206a. The plurality of rows include a plurality of row labels 202a and the plurality of columns include a plurality of column labels 204a. The row labels 202a and the column labels 204a comprise a sequence of integer numbers in a range from 0 to 9. Each block 206a of the authentication matrix 200a may include a multi-digit alphanumeric string, such as a 9-digit alphanumeric string, for example.

The spurious blocks 208-1 through 208-6 are illustrated as shaded with a "dotted" pattern, the authentication blocks 210-1 through 210-4 are illustrated as shaded with a "grid" pattern, and the special block 212 is illustrated as shaded with a "diagonal stripe" pattern in FIG. 2A. The spurious blocks 208-1 through 208-6 and the authentication blocks 210-1 through 210-4 are selected according to a block selection sequence 110a (see FIG. 1). In the illustrated embodiment, the block selection sequence 110a comprises a sequence of "spurious block, spurious block, authentication block, spurious block, spurious block, authentication block, spurious block, spurious block, authentication block, authentication block." In the illustrated embodiments, 6 spurious blocks and 4 authentication blocks are selected. In other embodiments, the number of spurious blocks and the number of authentication blocks may be chosen according to security requirements of the authentication process. The authentication blocks 210-1 through 210-4 are selected according to a lot-two authentication string 108c that corresponds to the lot-one authentication string 108b of the user 104 (see FIG. 1). In the illustrated embodiment, the lot-two authentication string 108c is a 4-digit PIN comprising 5678.

The block selection process starts with the processor 120 of the authentication management system 118 (see FIG. 1) selecting a first spurious block 208-1 of the authentication matrix 200a. In certain embodiments, the user device 106, in response to instructions received from the user 104, may send an instruction 116 to the processor 120 of the authentication management system 118 to select the first spurious block 208-1. The first spurious block 208-1 may be selected at random. In the illustrated embodiment, the first spurious block 208-1 is a block 206a that has a row label "0" and a column label "0." The processor 120 of the authentication management system 118 selects a second spurious block 208-2 of the authentication matrix 200a. In certain embodiments, the user device 106, in response to instructions received from the user 104, may send an instruction 116 to the processor 120 of the authentication management system 118 to select the second spurious block 208-2. The second spurious block 208-2 may be selected at random. In the illustrated embodiment, the second spurious block 208-2 is a block 206a that has a row label "6" and a column label "0."

The processor 120 of the authentication management system 118 selects a first authentication block 210-1 of the authentication matrix 200a based on a first digit and a second digit of the lot-two authentication string 108c. In certain embodiments, the user device 106, in response to instructions received from the user 104, may send an instruction 116 to the processor 120 of the authentication management system 118 to select the first authentication block 210-1. In the illustrated embodiment when the lot-two authentication string 108c is a 4-digit PIN comprising 5678, the first authentication block 210-1 is a block 206a that has a row label equal to the first digit "5" and a column label equal to the second digit "6."

The processor 120 of the authentication management system 118 selects a third spurious block 208-3 of the authentication matrix 200a. In certain embodiments, the user device 106, in response to instructions received from the user 104, may send an instruction 116 to the processor 120 of the authentication management system 118 to select the third spurious block 208-3. The third spurious block 208-3 may be selected at random. In the illustrated embodiment, the third spurious block 208-3 is a block 206a that has a row label "3" and a column label "1."

The processor 120 of the authentication management system 118 selects a fourth spurious block 208-4 of the authentication matrix 200a. In certain embodiments, the user device 106, in response to instructions received from the user 104, may send an instruction 116 to the processor 120 of the authentication management system 118 to select the fourth spurious block 208-4. The fourth spurious block 208-4 may be selected at random. In the illustrated embodiment, the fourth spurious block 208-4 is a block 206a that has a row label "4" and a column label "6."

The processor 120 of the authentication management system 118 selects a second authentication block 210-2 of the authentication matrix 200a based on the second digit and a third digit of the lot-two authentication string 108c. In certain embodiments, the user device 106, in response to instructions received from the user 104, may send an instruction 116 to the processor 120 of the authentication management system 118 to select the second authentication block 210-2. In the illustrated embodiment when the lot-two authentication string 108c is a 4-digit PIN comprising 5678, the second authentication block 210-2 is a block 206a that has a row label equal to the second digit "6" and a column label equal to the third digit "7."

The processor 120 of the authentication management system 118 selects a fifth spurious block 208-5 of the authentication matrix 200a. In certain embodiments, the user device 106, in response to instructions received from the user 104, may send an instruction 116 to the processor 120 of the authentication management system 118 to select the fifth spurious block 208-5. The fifth spurious block 208-5 may be selected at random. In the illustrated embodiment, the fifth spurious block 208-5 is a block 206a that has a row label "8" and a column label "6."

The processor 120 of the authentication management system 118 selects a sixth spurious block 208-6 of the authentication matrix 200a. In certain embodiments, the user device 106, in response to instructions received from the user 104, may send an instruction 116 to the processor 120 of the authentication management system 118 to select the sixth spurious block 208-6. The sixth spurious block 208-6 may be selected at random. In the illustrated embodiment, the sixth spurious block 208-6 is a block 206a that has a row label "5" and a column label "9."

The processor 120 of the authentication management system 118 selects a third authentication block 210-3 of the authentication matrix 200a based on the third digit and a fourth digit of the lot-two authentication string 108c. In certain embodiments, the user device 106, in response to instructions received from the user 104, may send an instruction 116 to the processor 120 of the authentication management system 118 to select the third authentication block 210-3. In the illustrated embodiment when the lot-two authentication string 108c is a 4-digit PIN comprising 5678, the third authentication block 210-3 is a block 206a that has a row label equal to the third digit "7" and a column label equal to the fourth digit "8."

The processor 120 of the authentication management system 118 selects a fourth authentication block 210-4 of the authentication matrix 200a based on the first digit and the fourth digit of the lot-two authentication string 108c. In certain embodiments, the user device 106, in response to instructions received from the user 104, may send an instruction 116 to the processor 120 of the authentication management system 118 to select the fourth authentication block 210-4. In the illustrated embodiment when the lot-two authentication string 108c is a 4-digit PIN comprising 5678, the fourth authentication block 210-4 is a block 206a that has a row label equal to the fourth digit "8" and a column label equal to the first digit "5."

After selecting the spurious blocks 208-1 through 208-6 and the authentication blocks 210-1 through 210-4, the processor 120 of the authentication management system 118 selects a special block 212 of the authentication matrix 200a. In certain embodiments, the user device 106, in response to instructions received from the user 104 according to a special block code 110c (see FIG. 1), may send an instruction 116 to the processor 120 of the authentication management system 118 to select the special block 212 according to the special block code 110c. In the illustrated embodiment, the special block 212 is a block 206a that has a row label "9" and a column label "0." In certain embodiments, the process of selecting the special block 212 may be omitted.

Figure 2B:
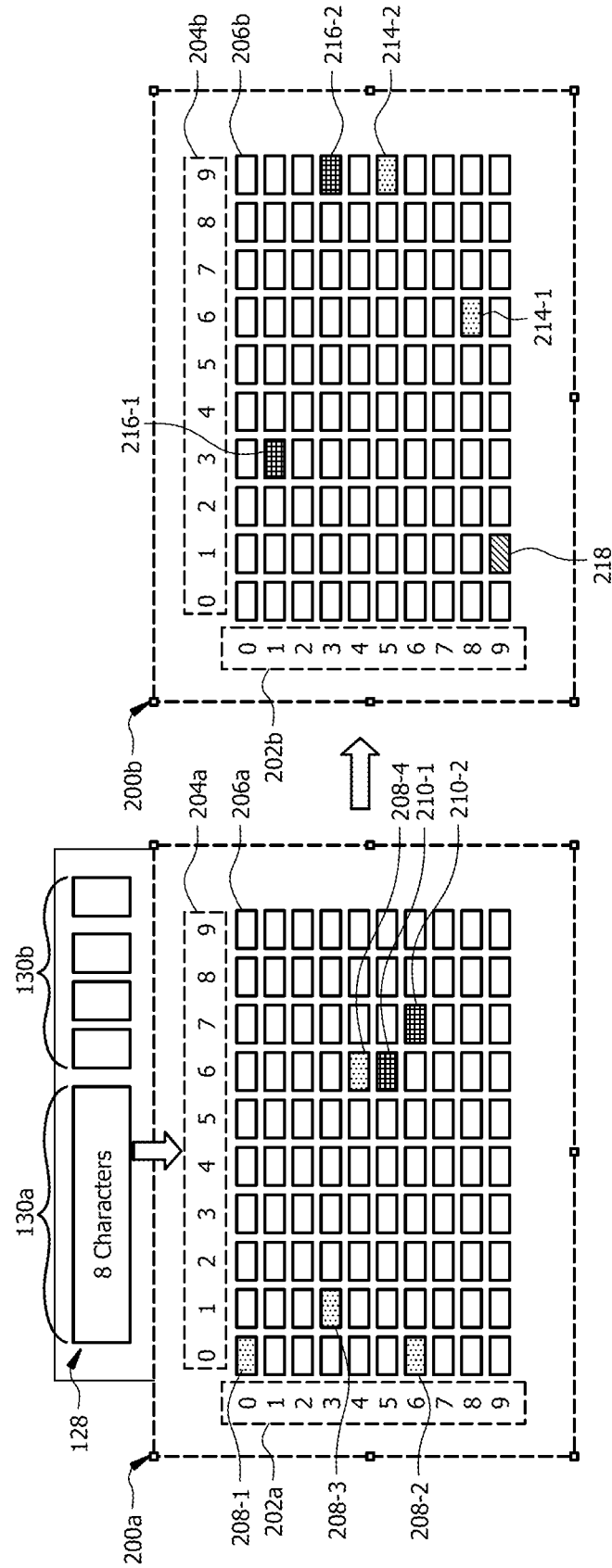
FIG. 2B illustrates an example block selection process for a spinning authentication matrix.

FIG. 2B illustrates an example block selection processes for a spinning authentication matrix. In certain embodiments, the block selection process includes selecting a plurality of spurious blocks 208-1, 208-2, 208-3, 208-4, 214-1 and 214-2, a plurality of authentication blocks 210-1, 210-2, 216-1 and 216-2, and a special block 218 from a plurality of blocks 206a and 206b of authentication matrices 200a and 200b. Since authentication matrices 200a and 200b are changing during the block selection process, a combination of the authentication matrices 200a and 200b may be also referred to as a spinning authentication matrix.

The spurious blocks 208-1, 208-2, 208-3, 208-4, 214-1 and 214-2 are illustrated as shaded with a "dotted" pattern, the authentication blocks 210-1, 210-2, 216-1, and 216-2 are illustrated as shaded with a "grid" pattern, and the special block 218 is illustrated as shaded with a "diagonal stripe" pattern in FIG. 2B. The spurious blocks 208-1, 208-2, 208-3, 208-4, 214-1 and 214-2, and the authentication blocks 210-1, 210-2, 216-1 and 216-2 are selected according to a block selection sequence 110a (see FIG. 1). In the illustrated embodiment, the block selection sequence 110a comprises a sequence of "spurious block, spurious block, authentication block, spurious block, spurious block, authentication block, spurious block, spurious block, authentication block, authentication block." In the illustrated embodiments, 6 spurious block and 4 authentication blocks are selected. In other embodiments, the number of spurious blocks and the number of authentication blocks may be chosen according to security requirements of the authentication process. The authentication blocks 210-1, 210-2, 216-1 and 216-2 are selected according to two of the lot-two authentication strings 108c that corresponds to the lot-one authentication string 108b of the user 104, with a first one of the lot-two authentication strings 108c being a 4-digit PIN comprising 5678 and a second one of the lot-two authentication strings 108c being a 4-digit PIN comprising 9013.

The block selection process starts with the processor 120 of the authentication management system 118 (see FIG. 1) the selecting spurious blocks 208-1 through 208-4 and the authentication blocks 210-1 and 210-2 of the first authentication matrix 200a as described above with reference to FIG. 2A and the description is not repeated herein. After selecting the second authentication block 210-2, the processor 120 of the authentication management system 118 determines if the first one of the lot-two authentication strings 108c was used in a previous authentication process. In response to determining that the first one of the lot-two authentication strings 108c was not used in the previous authentication process, processor 120 of the authentication management system 118 selects the spurious blocks 208-5 and 208-6, the authentication blocks 210-3 and 210-4, and a special block 212 of the first authentication matrix 200a as described above with reference to FIG. 2A and the description is not repeated herein.

In response to determining that the first one of the lot-two authentication strings 108c was used in the previous authentication process, the processor 120 of the authentication management system 118 generates a second authentication matrix 200b. In the illustrated embodiment, the second authentication matrix 200b is a 10-by-10 matrix comprising the plurality of blocks 206b. The plurality of rows include a plurality of row labels 202b and the plurality of columns include a plurality of column labels 204b. The row labels 202b and the column labels 204b comprise a sequence of integer numbers in a range from 0 to 9. Each block 206b of the authentication matrix 200b may include a multi-digit alphanumeric string, such as a 9-digit alphanumeric string, for example. In certain embodiments, the second authentication matrix 200b is different from the first authentication matrix 200a, such that the blocks 206b are different from the blocks 206a. The processor 120 of the authentication management system 118 replaces the first authentication matrix 200a with the second authentication matrix 200b.

The processor 120 of the authentication management system 118 selects a first spurious block 214-1 of the second authentication matrix 200b. In certain embodiments, the user device 106, in response to instructions received from the user 104, may send an instruction 116 to the processor 120 of the authentication management system 118 to select the first spurious block 214-1. The first spurious block 214-1 may be selected at random. In the illustrated embodiment, the first spurious block 214-1 is a block 206b that has a row label "8" and a column label "6."

The processor 120 of the authentication management system 118 selects a second spurious block 214-2 of the second authentication matrix 200b. In certain embodiments, the user device 106, in response to instructions received from the user 104, may send an instruction 116 to the processor 120 of the authentication management system 118 to select the second spurious block 214-2. The second spurious block 214-2 may be selected at random. In the illustrated embodiment, the second spurious block 214-2 is a block 206b that has a row label "5" and a column label "9."

The processor 120 of the authentication management system 118 selects a first authentication block 216-1 of the second authentication matrix 200b based on a third digit and a fourth digit of the second one of the lot-two authentication strings 108c. In certain embodiments, the user device 106, in response to instructions received from the user 104, may send an instruction 116 to the processor 120 of the authentication management system 118 to select the first authentication block 216-1. In the illustrated embodiment when the second one of the lot-two authentication strings 108c is a 4-digit PIN comprising 9013, the first authentication block 216-1 is a block 206b that has a row label equal to the third digit "1" and a column label equal to the fourth digit "3."

The processor 120 of the authentication management system 118 selects a second authentication block 216-2 of the second authentication matrix 200b based on a first digit and the fourth digit of the second one of the lot-two authentication strings 108c. In certain embodiments, the user device 106, in response to instructions received from the user 104, may send an instruction 116 to the processor 120 of the authentication management system 118 to select the second authentication block 216-2. In the illustrated embodiment when the second one of the lot-two authentication strings 108c is a 4-digit PIN comprising 9013, the second authentication block 216-2 is a block 206b that has a row label equal to the fourth digit "3" and a column label equal to the first digit "9."

The processor 120 of the authentication management system 118 selects a special block 218 of the second authentication matrix 200b. In certain embodiments, the user device 106, in response to instructions received from the user 104 according to a special block code 110c, may send an instruction 116 to the processor 120 of the authentication management system 118 to select the special block 218 according to the special block code 110c. In the illustrated embodiment, the special block 218 is a block 206b that has a row label "9" and a column label "1." In certain embodiments, the process of selecting the special block 218 may be omitted.

Figure 2C:
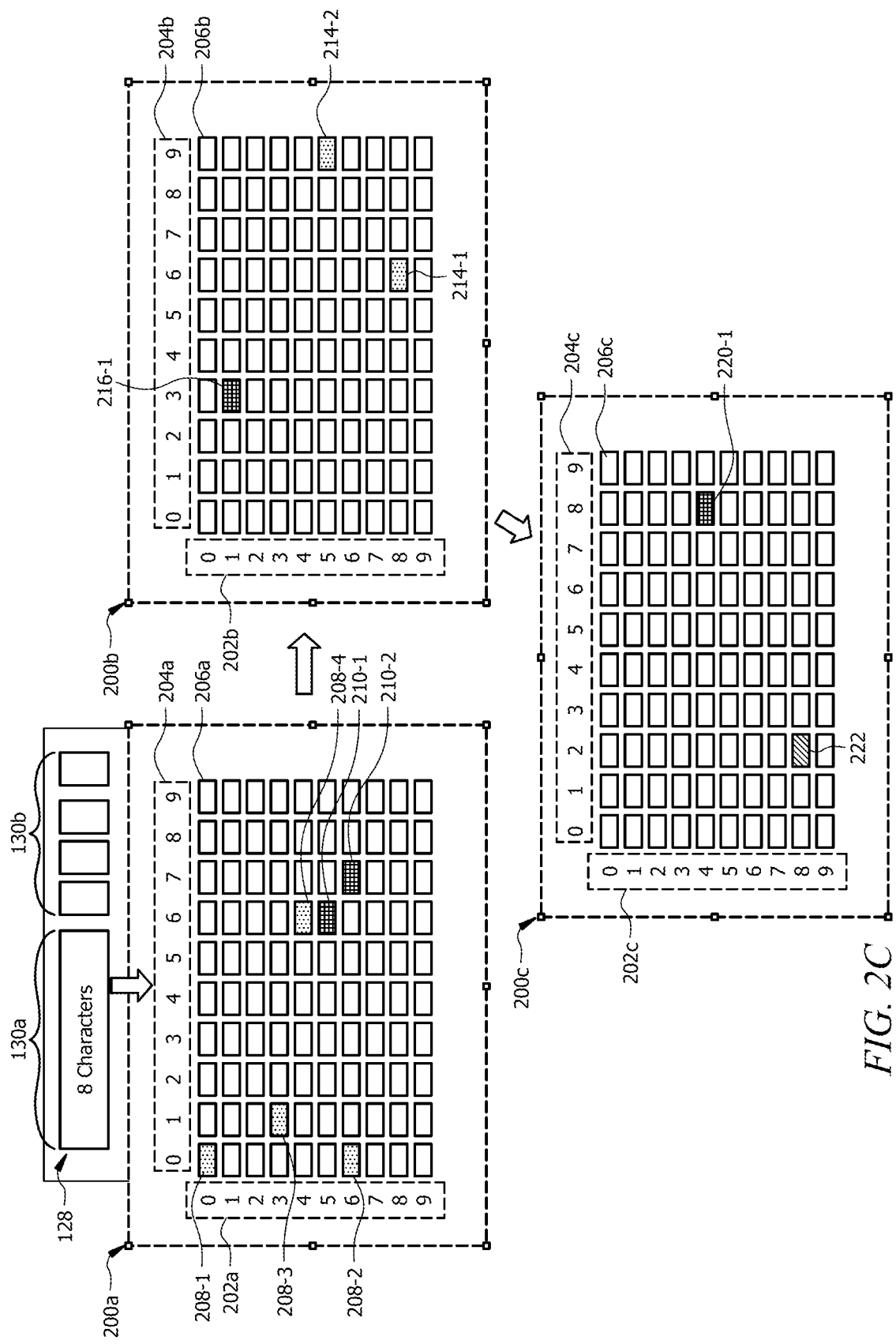
FIG. 2C illustrates an example block selection process for a spinning authentication matrix.

FIG. 2C illustrates an example block selection processes for a spinning authentication matrix. In certain embodiments, the block selection process includes selecting a plurality of spurious blocks 208-1, 208-2, 208-3, 208-4, 214-1 and 214-2, a plurality of authentication blocks 210-1, 210-2, 216-1 and 220-1, and a special block 222 from a plurality of blocks 206a, 206b and 206c of authentication matrices 200a, 200b and 200c. Since authentication matrices 200a, 200b, and 200c are changing during the block selection process, a combination of the authentication matrices 200a, 200b, and 200c may be also referred to as a spinning authentication matrix.

The spurious blocks 208-1, 208-2, 208-3, 208-4, 214-1 and 214-2 are illustrated as shaded with a "dotted" pattern, the authentication blocks 210-1, 210-2, 216-1, and 220-1 are illustrated as shaded with a "grid" pattern, and the special block 222 is illustrated as shaded with a "diagonal stripe" pattern in FIG. 2C. The blocks 208-1, 208-2, 208-3, 208-4, 214-1 and 214-2, and the authentication blocks 210-1, 210-2, 216-1 and 220-1 are selected according to a block selection sequence 110*a* (see FIG. 1). In the illustrated embodiment, the block selection sequence 110*a* comprises a sequence of "spurious block, spurious block, authentication block, spurious block, spurious block, authentication block, spurious block, spurious block, authentication block, authentication block." In the illustrated embodiments, 6 spurious block and 4 authentication blocks are selected. In other embodiments, the number of spurious blocks and the number of authentication blocks may be chosen according to security requirements of the authentication process. The authentication blocks 210-1, 210-2, 216-1 and 220-1 are selected according to three of the lot-two authentication strings 108*c* that corresponds to the lot-one authentication string 108*b* of the user 104, with a first one of the lot-two authentication strings 108*c* being a 4-digit PIN comprising 5678, a second one of the lot-two authentication strings 108*c* being a 4-digit PIN comprising 9013, and a third one of the lot-two authentication strings 108*c* being a 4-digit PIN comprising 8124.

The block selection process starts with the processor 120 of the authentication management system 118 selecting the spurious blocks 208-1, 208-2, 208-3, 208-4, 214-1 and 214-2, and the authentication blocks 210-1, 210-2, and 216-1 as described above with reference to FIG. 2B and the description is not repeated herein. After selecting the first authentication block 216-1 of the second authentication matrix 200*b*, the processor 120 of the authentication management system 118 generates a third authentication matrix 200*c*. In the illustrated embodiment, the third authentication matrix 200*c* is a 10-by-10 matrix comprising the plurality of blocks 206*c*. The plurality of rows include a plurality of row labels 202*c* and the plurality of columns include a plurality of column labels 204*c*. The row labels 202*c* and the column labels 204*c* comprise a sequence of integer numbers in a range from 0 to 9. Each block 206*c* of the third authentication matrix 200*c* may include a multi-digit alphanumeric string, such as a 9-digit alphanumeric string, for example. In certain embodiments, the third authentication matrix 200*c* is different from the second authentication matrix 200*b*, such that the blocks 206*c* are different from the blocks 206*b*. The processor 120 of the authentication management system 118 replaces the second authentication matrix 200*b* with the third authentication matrix 200*c*.

The processor 120 of the authentication management system 118 selects a first authentication block 220-1 of the third authentication matrix 200*c* based on a first digit and a fourth digit of the third one of the lot-two authentication strings 108*c*. In certain embodiments, the user device 106, in response to instructions received from the user 104, may send an instruction 116 to the processor 120 of the authentication management system 118 to select the first authentication block 220-1. In the illustrated embodiment when the third one of the lot-two authentication strings 108*c* is a 4-digit PIN comprising 8124, the first authentication block 220-1 is a block 206*c* that has a row label equal to the fourth digit "4" and a column label equal to the first digit "8."

The processor 120 of the authentication management system 118 selects a special block 222 of the third authentication matrix 200*c*. In certain embodiments, the user device 106, in response to instructions received from the user 104 according to a special block code 110*c*, may send an instruction 116 to the processor 120 of the authentication management system 118 to select the special block 222 according to the special block code 110*c*. In the illustrated embodiment, the special block 222 is a block 206*c* that has a row label "8" and a column label "2." In certain embodiments, the process of selecting the special block 222 may be omitted.

By using an authentication matrix to select spurious and authentication blocks a malicious user may fail to distinguish between authentication blocks and the spurious blocks and to obtain full authentication information of the user (such as, for example, one or more lot-two authentication strings) even if a keystroke logging malware or a screen capturing malware is installed on the user device by the malicious user. Furthermore, by employing the spinning authentication matrix, the authentication security of users is further improved, since the malicious user may fail to correlate selected blocks with one or more lot-two authentication strings used for selecting the spurious and authentication blocks and to identify the one or more lot-two authentication strings used during the block selection process.

Service Provider System

The service provider system 180 is generally any device that is configured to process data and communicate with other components of system 100 via network 102. In the illustrated embodiment, service provider system 180 comprises a data storage system. In other embodiments, service provider system 180 may comprise a web hosting system, a cloud computing system hosting micro application, or any other computing system configured to provide desired services to users. Service provider system 180 may comprise a processor 182 in signal communication with a memory 186 and a network interface 184.

Processor 182 comprises one or more processors operably coupled to memory 186. Processor 182 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 182 may be a programmable logic device, a microcontroller, a microprocessor, or any suitable combination of the preceding. The one or more processors are configured to process data and may be implemented in hardware or software. For example, processor 182 may be 8-bit, 16-bit, 32-bit, 64-bit, or of any other suitable architecture. The one or more processors are configured to implement various software instructions to perform the operations described herein. For example, the one or more processors are configured to execute software instructions 188 and perform one or more functions described herein.

Network interface 184 is configured to enable wired and/or wireless communications (e.g., via network 102). Network interface 184 is configured to communicate data between service provider system 180 and other components of system 100. For example, network interface 184 may comprise a WIFI interface, a local area network (LAN) interface, a wide area network (WAN) interface, a modem, a switch, or a router. Processor 182 is configured to send and receive data using network interface 184. Network interface 184 may be configured to use any suitable type of communication protocol as would be appreciated by one of ordinary skill in the art.

Memory 186 comprises a non-transitory computer-readable medium such as one or more disks, tape drives, or solid-state drives, and may be used as an over-flow data storage device, to store programs when such programs are selected for execution, and to store instructions and data that are read during program execution. Memory 186 may be volatile or non-volatile and may comprise a read-only memory (ROM), random-access memory (RAM), ternary content-addressable memory (TCAM), dynamic random-access memory (DRAM), and static random-access memory (SRAM). Memory 186 may be implemented using one or more disks, tape drives, solid-state drives, and/or the like. Memory 186 may store any of the information described in FIGS. 1, 2A-2C, 3A-3C, 4, 5A and 5B along with any other data, instructions, logic, rules, or code operable to implement the function(s) described herein. Memory 186 is operable to store software instructions 188 and/or any other data and instructions. Software instructions 188 may comprise any suitable set of software instructions, logic, rules, or code operable to be executed by processor 182. Memory 186 may be further operable to store a database 190 that comprises various data items used by service provider system 180 to provide desired services to users.

In operation, the service provider system 180 receives from the software instructions 188 a notification 178 that the user 104 was successfully authenticated. In response to receiving the notification 178, the service provider system 180 grants access to the user device 106 of the user 104.

Example Method for User Authentication Using an Authentication Matrix

Figure 3A:
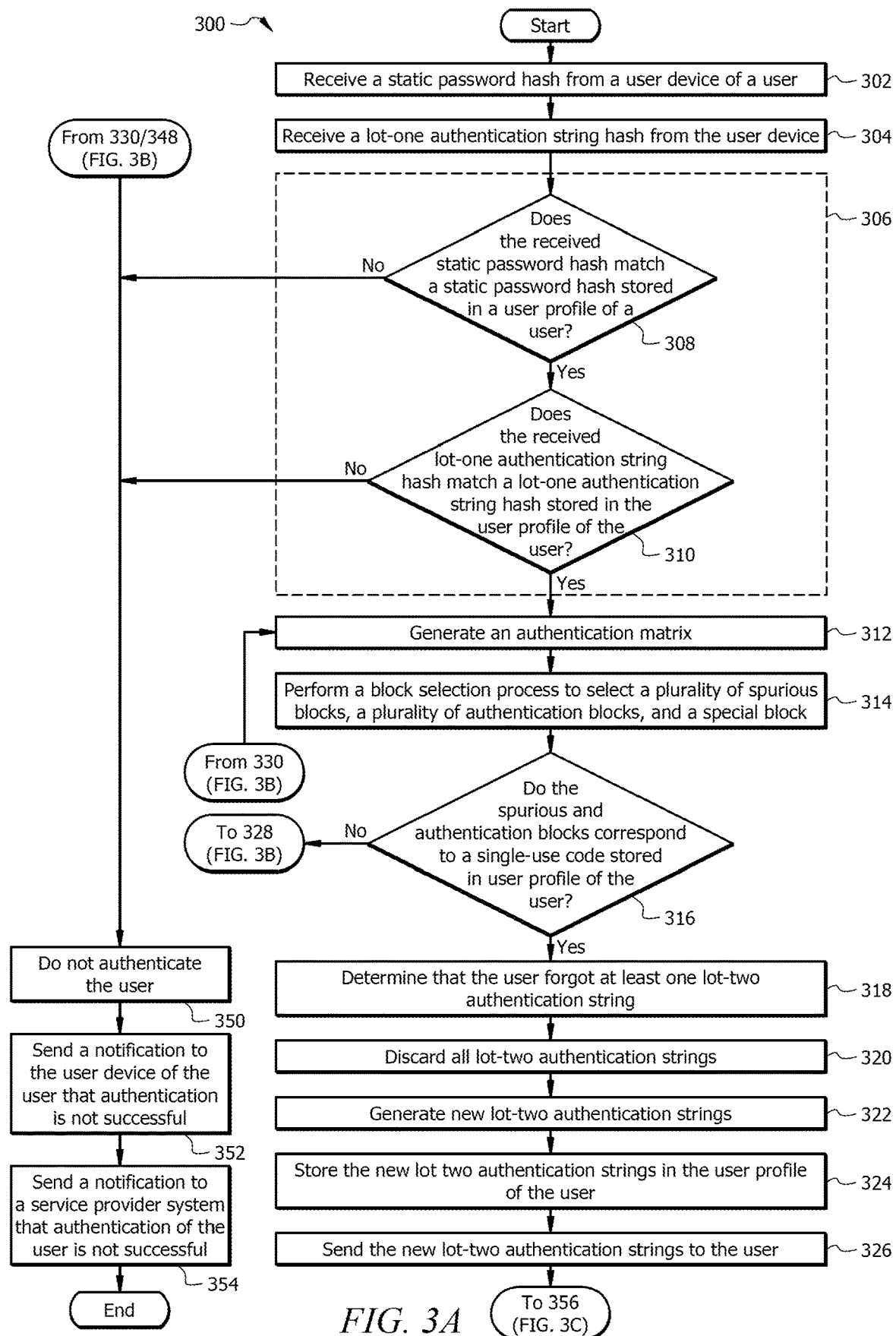
FIGS. 3A, 3B, and 3C illustrate an example operational flow of the system of FIG. 1 for user authentication using an authentication matrix.
Figure 3B:
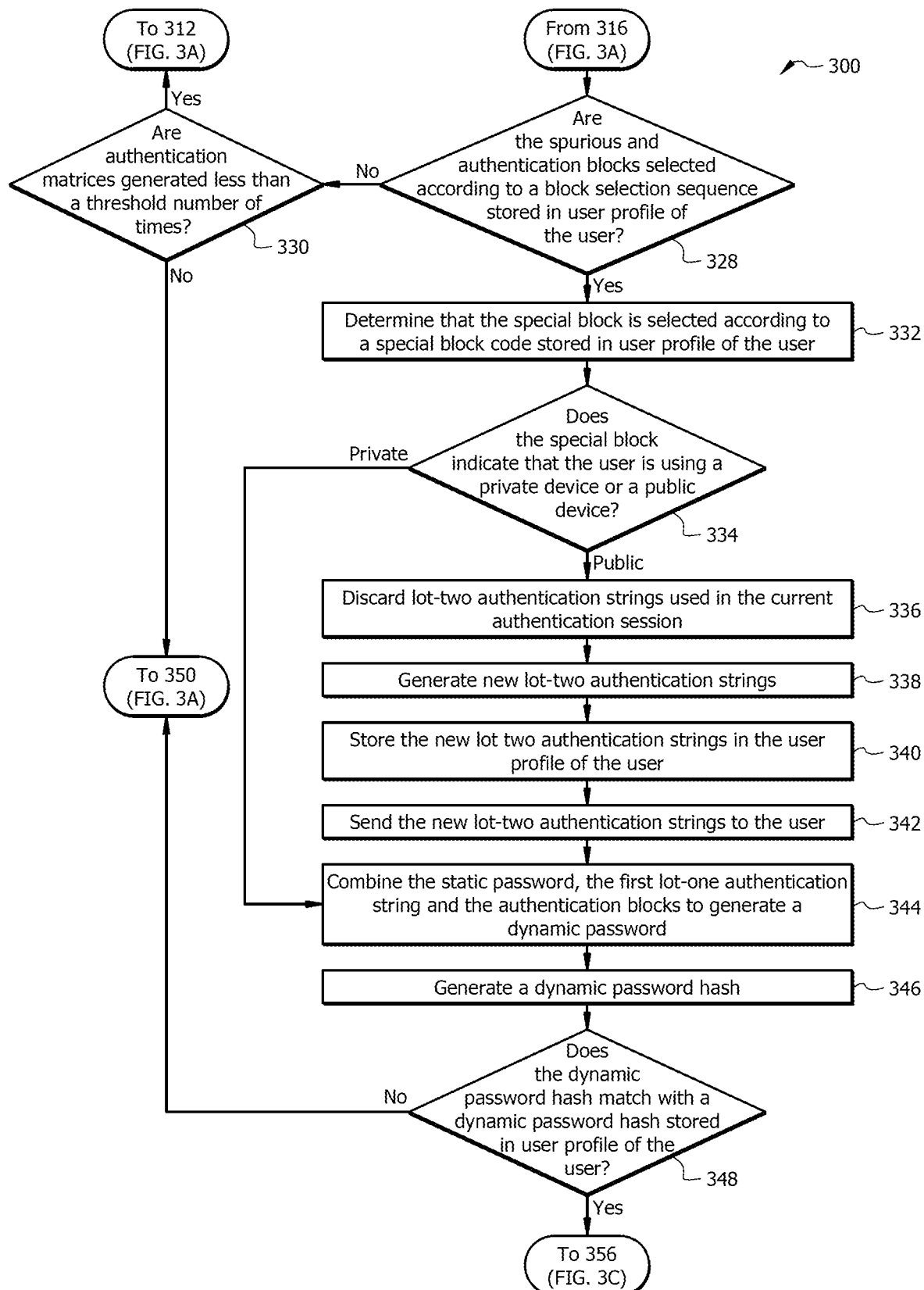
Figure 3C:
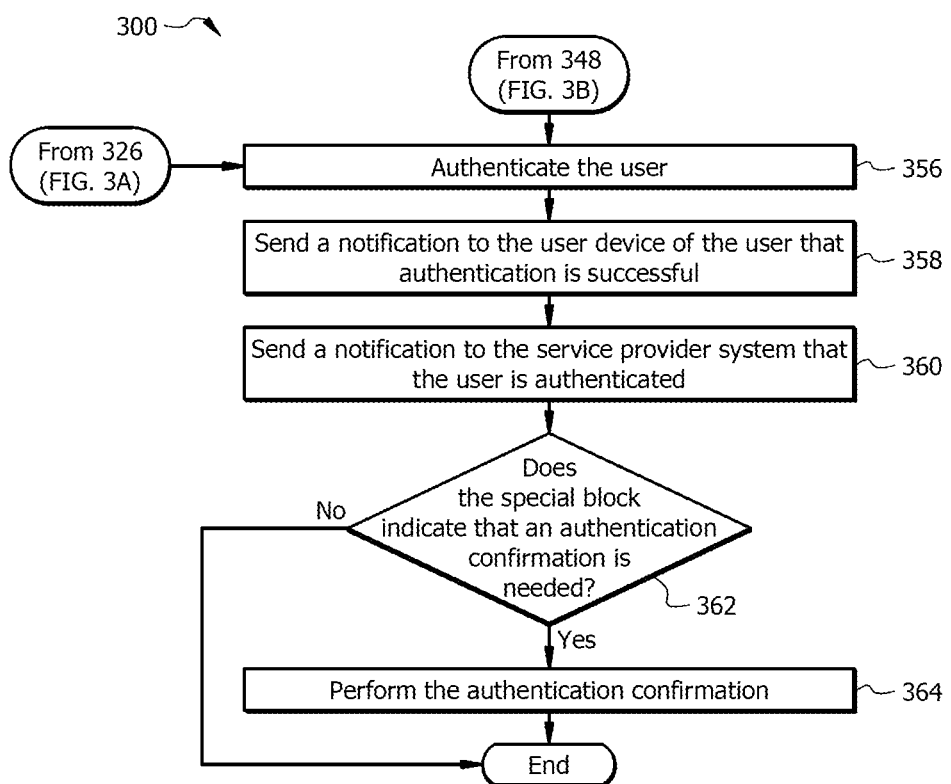

FIGS. 3A, 3B, and 3C illustrate an example flowchart of a method 300 for user authentication using an authentication matrix. Modifications, additions, or omissions may be made to method 300. Method 300 may include more, fewer, or other operations. For example, operations may be performed in parallel or in any suitable order. For example, one or more operations of method 300 may be implemented, at least in part, in the form of software instructions (e.g., software instructions 126 and/or 188 of FIG. 1), stored on non-transitory, tangible, computer-readable medium (e.g., memories 124 and/or 186 of FIG. 1) that when executed by one or more processors (e.g., processors 120 and/or 182 of FIG. 1) may cause the one or more processors to perform operations 302-364. Method 300 is described below with reference to FIG. 1.

Method 300 starts with operation 302, where a processor 120 of an authentication management system 118 receives a hash 112 of a static password 108a from a user device 106 of a user 104 (see FIG. 1). The static password 108a may be a multi-digit alphanumeric string. In certain embodiments, the static password 108a is an 8-digit or 8-character alphanumeric string.

At operation 304, the processor 120 of the authentication management system 118 receives a hash 114 of a lot-one authentication string (e.g., respective one of the lot-one authentication strings 108b of FIG. 1) from the user device 106 (see FIG. 1). The lot-one authentication string may be any of the lot-one authentication strings 108b. The lot-one authentication string 108b may be a multi-digit alphanumeric string. In certain embodiments, the lot-one authentication string 108b is a 4-digit personal identification number (PIN) with each digit being an integer number in a range from 0 to 9.

At operation 306, the processor 120 of the authentication management system 118 performs an initial validation of the user 104. In certain embodiments, the initial validation process comprises performing operations 308 and 310.

At operation 308, the processor 120 of the authentication management system 118 determines if the hash 112 of the static password 108a matches a hash (e.g., respective one of hashes 136-1 through 136-m of FIG. 1) of a static password (e.g., respective one of static passwords 134-1 through 134-m of FIG. 1) that is stored in a user profile (e.g., respective one of user profile 132-1 through 132-m of FIG. 1) stored in a memory 124 of the authentication management system 118.

In response to determining at operation 308 that the hash 112 of the static password 108a does not match the hash (e.g., respective one of hashes 136-1 through 136-m of FIG. 1) of the static password (e.g., respective one of static passwords 134-1 through 134-m of FIG. 1) that is stored in the user profile (e.g., respective one of user profile 132-1 through 132-m of FIG. 1) stored in the memory 124 of the authentication management system 118, method 300 continues to operation 350.

In response to determining at operation 308 that the hash 112 of the static password 108a matches the hash (e.g., respective one of hashes 136-1 through 136-m of FIG. 1) of the static password (e.g., respective one of static passwords 134-1 through 134-m of FIG. 1) that is stored in the user profile (e.g., respective one of user profile 132-1 through 132-m of FIG. 1) stored in the memory 124 of the authentication management system 118, method 300 continues to operation 310. At operation 310, the processor 120 of the authentication management system 118 determines if the hash 114 of the lot-one authentication string 108b matches a hash (e.g., respective one of hashes 140-1 through 140-m of FIG. 1) of a lot-one authentication string (e.g., respective one of lot-one authentication strings 138-1 through 138-m of FIG. 1) that is stored in the user profile (e.g., respective one of user profile 132-1 through 132-m of FIG. 1) stored in the memory 124 of the authentication management system 118.

In response to determining at operation 310 that the hash 114 of the lot-one authentication string 108b does not match the hash (e.g., respective one of hashes 140-1 through 140-m of FIG. 1) of the lot-one authentication string (e.g., respective one of lot-one authentication strings 138-1 through 138-m of FIG. 1) that is stored in the user profile (e.g., respective one of user profile 132-1 through 132-m of FIG. 1) stored in the memory 124 of the authentication management system 118, method 300 continues to operation 350.

In response to determining at operation 310 that the hash 114 of the lot-one authentication string 108b matches the hash (e.g., respective one of hashes 140-1 through 140-m of FIG. 1) of the lot-one authentication string (e.g., respective one of lot-one authentication strings 138-1 through 138-m of FIG. 1) that is stored in the user profile (e.g., respective one of user profile 132-1 through 132-m of FIG. 1) stored in the memory 124 of the authentication management system 118, method 300 continues to operation 312.

At operation 312, the processor 120 of the authentication management system 118 generates an authentication matrix 154. The authentication matrix 154 comprises a plurality of blocks 156 arranged in a plurality of rows and a plurality of columns. The plurality of rows include a plurality of row labels 158 and the plurality of columns include a plurality of column labels 160. The row labels 158 and the column labels 160 comprise alphanumeric characters. In certain embodiments, the authentication matrix 154 may be a 10-by-10 matrix having 10 rows, 10 columns, and 100 blocks. In such embodiments, the row labels 158 and the column labels 160 may comprise a sequence of integer numbers in a range from 0 to 9. Each block 156 of the authentication matrix 154 may include a multi-digit alphanumeric character, such as a 9-digit alphanumeric character, for example.

At operation 314, the processor 120 of the authentication management system 118 performs a block selection process to select a plurality of spurious blocks 162, a plurality of authentication blocks 164, and a special block 166 from one or more authentication matrices 154. In certain embodiments, the plurality of spurious blocks 162 and the plurality of authentication blocks 164 are selected according to a block selection sequence 110a, such that the plurality of authentication blocks 164 are selected based on one or more of lot-two authentication strings 108c that correspond to the lot-one authentication string 108b. The special block 166 is selected after selecting the plurality of spurious blocks 162 and the plurality of authentication blocks 164. The special block 166 may indicate that the user 104 is using a private device, the user 104 is using a public device, or an authentication confirmation is needed for the user 104. In certain embodiments, the special block 166 may be omitted. The lot-two authentication strings 108c may be multi-digit alphanumeric strings. In certain embodiments, the lot-two authentication strings 108c are 4-digit personal identification numbers (PINs), with each digit being an integer number in a range from 0 to 9. In certain embodiments, the block selection process is performed according to method 400 of FIG. 4. In other embodiments, the block selection process is performed according to method 500 of FIGS. 5A and 5B.

In certain embodiments when the user 104 forgets one or more of the lot-two authentication strings 108c, the block selection process is performed based on a single-use code 110b. The single-use code 110b comprises information for identifying the plurality of spurious blocks 162 and the plurality of authentication blocks 164. In certain embodiments, the single-use code 110b comprises row and column labels for each of the plurality of spurious blocks 162 and each of the plurality of authentication blocks 164.

At operation 316, the processor 120 of the authentication management system 118 determines if the spurious blocks 162 and the authentication blocks 164 correspond to a single-use code (e.g., respective one of single-use code 150-1 through 150-m of FIG. 1) that is stored in the user profile (e.g., respective one of user profiles 132-1 through 132-m of FIG. 1) stored in the memory 124 of the authentication management system 118. In response to determining at operation 316 that the spurious blocks 162 and the authentication blocks 164 correspond to the single-use code (e.g., respective one of single-use code 150-1 through 150-m of FIG. 1) that is stored in the user profile (e.g., respective one of user profiles 132-1 through 132-m of FIG. 1) stored in the memory 124 of the authentication management system 118, method 300 continues to operation 318.

At operation 318, the processor 120 of the authentication management system 118 determines that the user 104 forgot at least one of the lot-two authentication strings 108c. At operation 320, the processor 120 of the authentication management system 118 discards all of the lot-two authentication strings 108c. At operation 322, the processor 120 of the authentication management system 118 generates new lot-two authentication strings 174. At operation 324, the processor 120 of the authentication management system 118 stores the new lot-two authentication strings 174 in the user profile (e.g., respective one of user profiles 132-1 through 132-m of FIG. 1) stored in the memory 124 of the authentication management system 118. At operation 326, the processor 120 of the authentication management system 118 sends the new lot-two authentication strings 174 to the user 104. In certain embodiments, the processor 120 of the authentication management system 118 sends the new lot-two authentication strings 174 to the user device 106 of the user 104 using an electronic mail. After performing operation 326, method 300 continues to operation 356.

In response to determining at operation 316 that the spurious blocks 162 and the authentication blocks 164 do not correspond to the single-use code (e.g., respective one of single-use code 150-1 through 150-m of FIG. 1) that is stored in the user profile (e.g., respective one of user profiles 132-1 through 132-m of FIG. 1) stored in the memory 124 of the authentication management system 118, method 300 continues to operation 338. At operation 328, the processor 120 of the authentication management system 118 determines if the spurious blocks 162 and the authentication blocks 164 are selected according to a block selection sequence (e.g., respective one of block selection sequences 146-1 through 146-m of FIG. 1) that is stored in the user profile (e.g., respective one of user profiles 132-1 through 132-m of FIG. 1) stored in the memory 124 of the authentication management system 118.

In response to determining at operation 328 that the spurious blocks 162 and the authentication blocks 164 are not selected according to the block selection sequence (e.g., respective one of block selection sequences 146-1 through 146-m of FIG. 1) that is stored in the user profile (e.g., respective one of user profiles 132-1 through 132-m of FIG. 1) stored in the memory 124 of the authentication management system 118, method 300 continues operation 330. In certain embodiments, the processor 120 of the authentication management system 118 determines that the spurious blocks 162 and the authentication blocks 164 are not selected according to the block selection sequence (e.g., respective one of block selection sequences 146-1 through 146-m of FIG. 1) that is stored in the user profile (e.g., respective one of user profiles 132-1 through 132-m of FIG. 1) stored in the memory 124 of the authentication management system 118 when the user 104 makes a mistake while selecting the spurious blocks 162 and the authentication blocks 164. For example, the user 104 may make a mistake by selecting the spurious blocks 162 and the authentication blocks 164 in order that is different from the block selection sequence (e.g., respective one of block selection sequences 146-1 through 146-m of FIG. 1).

At operation 330, the processor 120 of the authentication management system 118 determines if the authentication matrices 154 are generated less than a threshold number 168 of times. In response to determining at operation 330 that the authentication matrices 154 are generated less than the threshold number 168 of times, method 300 continues to operation 312. In certain embodiments, operations 312, 214, 316, 328, and 330 may be performed one or more times until the authentication matrices 154 are generated the threshold number 168 of times. In response to determining at operation 330 that the authentication matrices 154 are generated the threshold number 168 of times, method 300 continues to operation 350. In response to determining at operation 328 that the spurious blocks 162 and the authentication blocks 164 are selected according to the block selection sequence (e.g., respective one of block selection sequences 146-1 through 146-m of FIG. 1) that is stored in the user profile (e.g., respective one of user profiles 132-1 through 132-m of FIG. 1) stored in the memory 124 of the authentication management system 118, method 300 continues operation 332.

At operation 332, the processor 120 of the authentication management system 118 determines that the special block 166 is selected according to a special block code (e.g., respective one of special block codes 152-1 through 152-*m* of FIG. 1) that is stored in the user profile (e.g., respective one of user profiles 132-1 through 132-*m* of FIG. 1) stored in the memory 124 of the authentication management system 118. In certain embodiments, the processor 120 of the authentication management system 118 may compare row and column labels of the special block 166 to the special block codes (e.g., special block codes 152-1 through 152-*m* of FIG. 1) that are stored in the user profile (e.g., respective one of user profiles 132-1 through 132-*m* of FIG. 1) stored in the memory 124 of the authentication management system 118.

At operation 334, the processor 120 of the authentication management system 118 determines if the special block 166 indicates that the user 104 is using a private device or a public device. In response to determining at operation 334 that the user 104 is using the private device, method 300 continues to operation 344. In response to determining at operation 334 that the user 104 is using the public device, method 300 continues to operation 336.

At operation 336, the processor 120 of the authentication management system 118 discards lot-two authentication strings (e.g., respective one of lot-two authentication strings 142-1 through 142-*m* of FIG. 1) that are used in the current authentication session. At operation 338, the processor 120 of the authentication management system 118 generates new lot-two authentication strings 174. At operation 340, the processor 120 of the authentication management system 118 stores the new lot-two authentication strings 174 in the user profile (e.g., respective one of user profiles 132-1 through 132-*m* of FIG. 1) stored in the memory 124 of the authentication management system 118. At operation 342, the processor 120 of the authentication management system 118 sends the new lot-two authentication strings 174 to the user 104. In certain embodiments, the processor 120 of the authentication management system 118 sends the new lot-two authentication strings 174 to the user device 106 of the user 104 using an electronic mail.

In response to determining at operation 334 that the user 104 is using the private device or after performing operation 342, method 300 continues to operation 344. At operation 344, the processor 120 of the authentication management system 118 combines the static password 108*a*, the first lot-one authentication string 108*b* and the authentication blocks 164 to generate a dynamic password 170. In certain embodiments, combining the static password 108*a*, the first lot-one authentication string 108*b* and the authentication blocks 164 comprises concatenating strings of the static password 108*a*, the first lot-one authentication string 108*b* and the authentication blocks 164. At operation 346, the processor 120 of the authentication management system 118 generates a hash 172 of the dynamic password 170 by applying a suitable hash function to the dynamic password 170.

At operation 348, the processor 120 of the authentication management system 118 determines if the hash 172 matches a dynamic password hash (e.g., respective one of dynamic password hashes 148-1 through 148-*m* of FIG. 1) that is stored in the user profile (e.g., respective one of user profiles 132-1 through 132-*m* of FIG. 1) stored in the memory 124 of the authentication management system 118. In response to determining at operation 308 that the hash 112 of the static password 108*a* does not match the hash (e.g., respective one of hashes 136-1 through 136-*m* of FIG. 1) of the static password (e.g., respective one of static passwords 134-1 through 134-*m* of FIG. 1) that is stored in the user profile (e.g., respective one of user profile 132-1 through 132-*m* of FIG. 1) stored in the memory 124 of the authentication management system 118, in response to determining at operation 310 that the hash 114 of the lot-one authentication string 108*b* does not match the hash (e.g., respective one of hashes 140-1 through 140-*m* of FIG. 1) of the lot-one authentication string (e.g., respective one of lot-one authentication strings 138-1 through 138-*m* of FIG. 1) that is stored in the user profile (e.g., respective one of user profile 132-1 through 132-*m* of FIG. 1) stored in the memory 124 of the authentication management system 118, in response to determining at operation 330 that the authentication matrices 154 are generated the threshold number 168 of times, or in response to determining at operation 348 that the hash 172 does not match the dynamic password hash (e.g., respective one of dynamic password hashes 148-1 through 148-*m* of FIG. 1) that is stored in the user profile (e.g., respective one of user profiles 132-1 through 132-*m* of FIG. 1) stored in the memory 124 of the authentication management system 118, method 300 continues to 350.

At operation 350, the processor 120 of the authentication management system 118 does not authenticate the user 104. At operation 352, the processor 120 of the authentication management system 118 sends a notification 176 to the user device 106 of the user 104 that authentication is not successful. At operation 354, the processor 120 of the authentication management system 118 sends a notification 178 to a service provider system 180 that authentication of the user 104 is not successful. After performing operation 354, method 300 ends.

In response to determining at operation 348 that the hash 172 matches the dynamic password hash (e.g., respective one of dynamic password hashes 148-1 through 148-*m* of FIG. 1) that is stored in the user profile (e.g., respective one of user profiles 132-1 through 132-*m* of FIG. 1) stored in the memory 124 of the authentication management system 118 or after performing operation 326, method 300 continues to operation 356. At operation 356, the processor 120 of the authentication management system 118 authenticate the user 104. At operation 358, the processor 120 of the authentication management system 118 sends a notification 176 to the user device 106 of the user 104 that authentication is successful. At operation 360, the processor 120 of the authentication management system 118 sends a notification 178 to the service provider system 180 that the user 104 is successfully authenticated.

At operation 362, the processor 120 of the authentication management system 118 determines if the special block 166 indicates that an authentication confirmation is needed. In response to determining at operation 362 that the authentication confirmation is not needed, method 300 ends. In response to determining at operation 364 that the authentication confirmation is needed, method 300 continues to operation 364. At operation 364, the processor 120 of the authentication management system 118 performs the authentication confirmation. In certain embodiments, the authentication confirmation is performed user using a non-custodial wallet. After performing operation 364, method 300 ends.

An Example Block Selection Process for a Static Authentication Matrix

Figure 4:
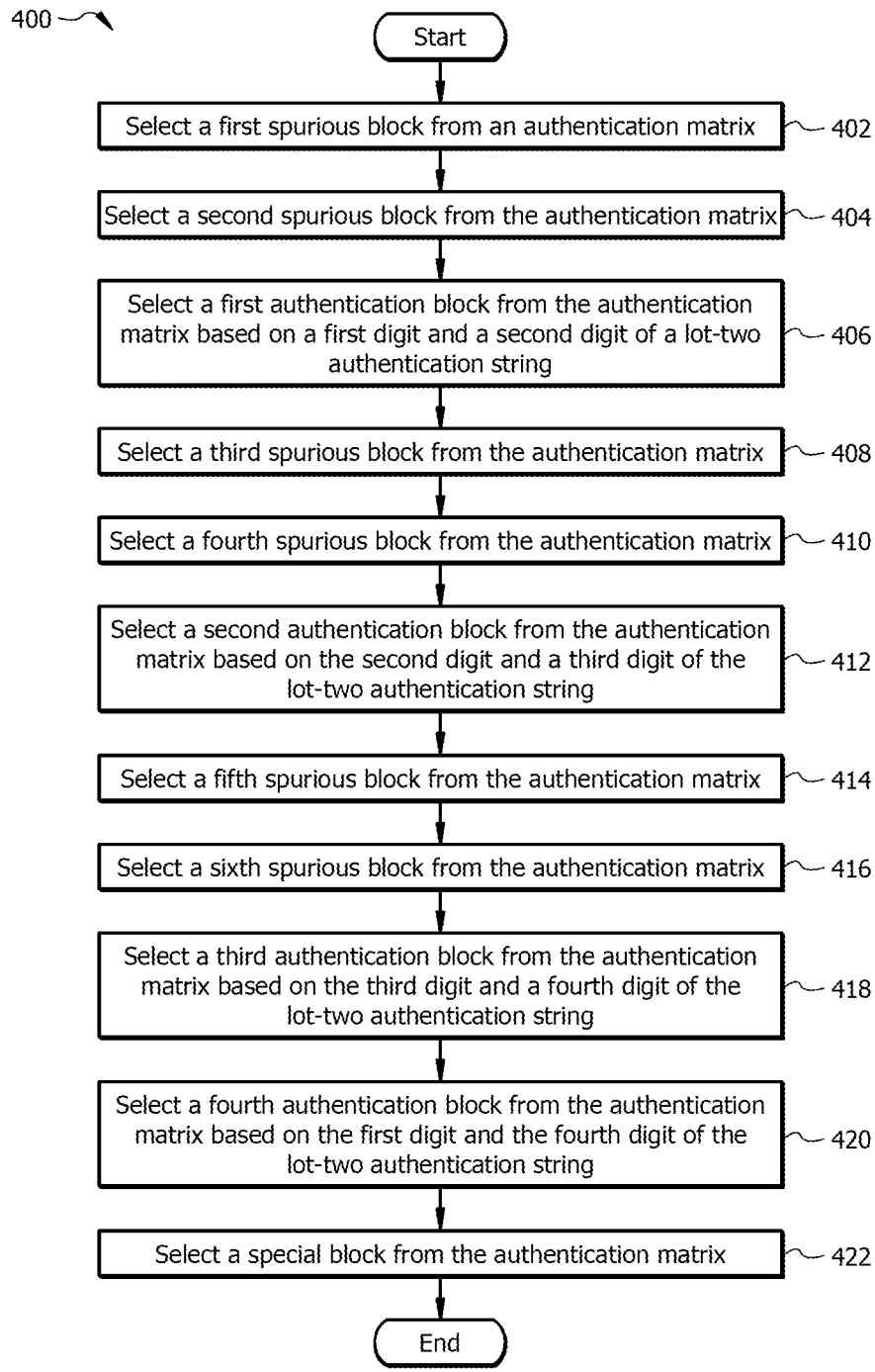
FIG. 4 illustrates an example operational flow of a block selection process for a static authentication matrix.

FIG. 4 illustrates an example flowchart of a method 400 for a block selection process for a static authentication matrix. Modifications, additions, or omissions may be made to method 400. Method 400 may include more, fewer, or other operations. For example, operations may be performed in parallel or in any suitable order. For example, one or more operations of method 400 may be implemented, at least in part, in the form of software instructions (e.g., software instructions 126 and/or 188 of FIG. 1), stored on non-transitory, tangible, computer-readable medium (e.g., memories 124 and/or 186 of FIG. 1) that when executed by one or more processors (e.g., processors 120 and/or 182 of FIG. 1) may cause the one or more processors to perform operations 402-422. Method 400 is described below with reference to FIGS. 1 and 2A.

Method 400 describes a block selection process that selects a plurality of spurious blocks 208-1 through 208-6, a plurality of authentication blocks 210-1 through 210-4, and a special block 212 from a plurality of blocks 206a of an authentication matrix 200a (see FIG. 2A). Since all spurious blocks 208-1 through 208-6 and all authentication blocks 210-1 through 210-4 are selected from the same authentication matrix 200a, the authentication matrix 200a may be also referred to as a static authentication matrix. In the illustrated embodiment, the authentication matrix 200a is a 10-by-10 matrix comprising the plurality of blocks 206a. The plurality of rows includes a plurality of row labels 202a and the plurality of columns include a plurality of column labels 204a. The row labels 202a and the column labels 204a comprise a sequence of integer numbers in a range from 0 to 9. Each block 206a of the authentication matrix 200a may include a multi-digit alphanumeric string, such as a 9-digit alphanumeric string, for example.

The plurality of spurious blocks 208-1 through 208-6 are illustrated as shaded with a "dotted" pattern, the plurality of authentication blocks 210-1 through 210-4 are illustrated as shaded with a "grid" pattern, and the special block 212 is illustrated as shaded with a "diagonal stripe" pattern in FIG. 2A. The plurality of spurious blocks 208-1 through 208-6 and the plurality of authentication blocks 210-1 through 210-4 are selected according to a block selection sequence 110a (see FIG. 1). In the illustrated embodiment, the block selection sequence 110a comprises a sequence of "spurious block, spurious block, authentication block, spurious block, spurious block, authentication block, spurious block, spurious block, authentication block, authentication block." In the illustrated embodiments, 6 spurious blocks and 4 authentication blocks are selected. In other embodiments, the number of spurious blocks and the number of authentication blocks may be chosen according to security requirements of the authentication process. The authentication blocks 210-1 through 210-4 are selected according to a lot-two authentication string (e.g., respective one of lot-two authentication string 108c of FIG. 1) that corresponds to the lot-one authentication string 108b of the user 104. The lot-two authentication string may be any of the of lot-two authentication string 108c. In the illustrated embodiment, the lot-two authentication string 108c is a 4-digit PIN comprising 5678.

Method 400 starts with operation 402, where the processor 120 of the authentication management system 118 (see FIG. 1) selects a first spurious block 208-1 of the authentication matrix 200a. In certain embodiments, the user device 106, in response to instructions received from the user 104, may send an instruction 116 to the processor 120 of the authentication management system 118 to select the first spurious block 208-1. The first spurious block 208-1 may be selected at random. In the illustrated embodiment, the first spurious block 208-1 is a block 206a that has a row label "0" and a column label "0."

At operation 404, the processor 120 of the authentication management system 118 selects a second spurious block 208-2 of the authentication matrix 200a. In certain embodiments, the user device 106, in response to instructions received from the user 104, may send an instruction 116 to the processor 120 of the authentication management system 118 to select the second spurious block 208-2. The second spurious block 208-2 may be selected at random. In the illustrated embodiment, the second spurious block 208-2 is a block 206a that has a row label "6" and a column label "0."

At operation 406, the processor 120 of the authentication management system 118 selects a first authentication block 210-1 of the authentication matrix 200a based on a first digit and a second digit of the lot-two authentication string 108c. In certain embodiments, the user device 106, in response to instructions received from the user 104, may send an instruction 116 to the processor 120 of the authentication management system 118 to select the first authentication block 210-1. In the illustrated embodiment when the lot-two authentication string 108c is a 4-digit PIN comprising 5678, the first authentication block 210-1 is a block 206a that has a row label equal to the first digit "5" and a column label equal to the second digit "6."

At operation 408, the processor 120 of the authentication management system 118 selects a third spurious block 208-3 of the authentication matrix 200a. In certain embodiments, the user device 106, in response to instructions received from the user 104, may send an instruction 116 to the processor 120 of the authentication management system 118 to select the third spurious block 208-3. The third spurious block 208-3 may be selected at random. In the illustrated embodiment, the third spurious block 208-3 is a block 206a that has a row label "3" and a column label "1."

At operation 410, the processor 120 of the authentication management system 118 selects a fourth spurious block 208-4 of the authentication matrix 200a. In certain embodiments, the user device 106, in response to instructions received from the user 104, may send an instruction 116 to the processor 120 of the authentication management system 118 to select the fourth spurious block 208-4. The fourth spurious block 208-4 may be selected at random. In the illustrated embodiment, the fourth spurious block 208-4 is a block 206a that has a row label "4" and a column label "6."

At operation 412, the processor 120 of the authentication management system 118 selects a second authentication block 210-2 of the authentication matrix 200a based on the second digit and a third digit of the lot-two authentication string 108c. In certain embodiments, the user device 106, in response to instructions received from the user 104, may send an instruction 116 to the processor 120 of the authentication management system 118 to select the second authentication block 210-2. In the illustrated embodiment when the lot-two authentication string 108c is a 4-digit PIN comprising 5678, the second authentication block 210-2 is a block 206a that has a row label equal to the second digit "6" and a column label equal to the third digit "7."

At operation 414, the processor 120 of the authentication management system 118 selects a fifth spurious block 208-5 of the authentication matrix 200a. In certain embodiments, the user device 106, in response to instructions received from the user 104, may send an instruction 116 to the processor 120 of the authentication management system 118 to select the fifth spurious block 208-5. The fifth spurious block 208-5 may be selected at random. In the illustrated embodiment, the fifth spurious block 208-5 is a block 206a that has a row label "8" and a column label "6."

At operation 416, the processor 120 of the authentication management system 118 selects a sixth spurious block 208-6 of the authentication matrix 200a. In certain embodiments, the user device 106, in response to instructions received from the user 104, may send an instruction 116 to the processor 120 of the authentication management system 118 to select the sixth spurious block 208-6. The sixth spurious block 208-6 may be selected at random. In the illustrated embodiment, the sixth spurious block 208-6 is a block 206a that has a row label "5" and a column label "9."

At operation 418, the processor 120 of the authentication management system 118 selects a third authentication block 210-3 of the authentication matrix 200a based on the third digit and a fourth digit of the lot-two authentication string 108c. In certain embodiments, the user device 106, in response to instructions received from the user 104, may send an instruction 116 to the processor 120 of the authentication management system 118 to select the third authentication block 210-3. In the illustrated embodiment when the lot-two authentication string 108c is a 4-digit PIN comprising 5678, the third authentication block 210-3 is a block 206a that has a row label equal to the third digit "7" and a column label equal to the fourth digit "8."

At operation 420, the processor 120 of the authentication management system 118 selects a fourth authentication block 210-4 of the authentication matrix 200a based on the first digit and the fourth digit of the lot-two authentication string 108c. In certain embodiments, the user device 106, in response to instructions received from the user 104, may send an instruction 116 to the processor 120 of the authentication management system 118 to select the fourth authentication block 210-4. In the illustrated embodiment when the lot-two authentication string 108c is a 4-digit PIN comprising 5678, the fourth authentication block 210-4 is a block 206a that has a row label equal to the fourth digit "8" and a column label equal to the first digit "5."

At operation 422, the processor 120 of the authentication management system 118 selects a special block 212 of the authentication matrix 200a. In certain embodiments, the user device 106, in response to instructions received from the user 104 according to a special block code 110c, may send an instruction 116 to the processor 120 of the authentication management system 118 to select the special block 212 according to the special block code 110c. In the illustrated embodiment, the special block 212 is a block 206a that has a row label "9" and a column label "0." After performing operation 422, method 400 ends. In certain embodiments, operation 422 may be omitted. In such embodiments, method 400 ends after performing operation 420.

An Example Block Selection Process for a Spinning Authentication Matrix

Figure 5A:
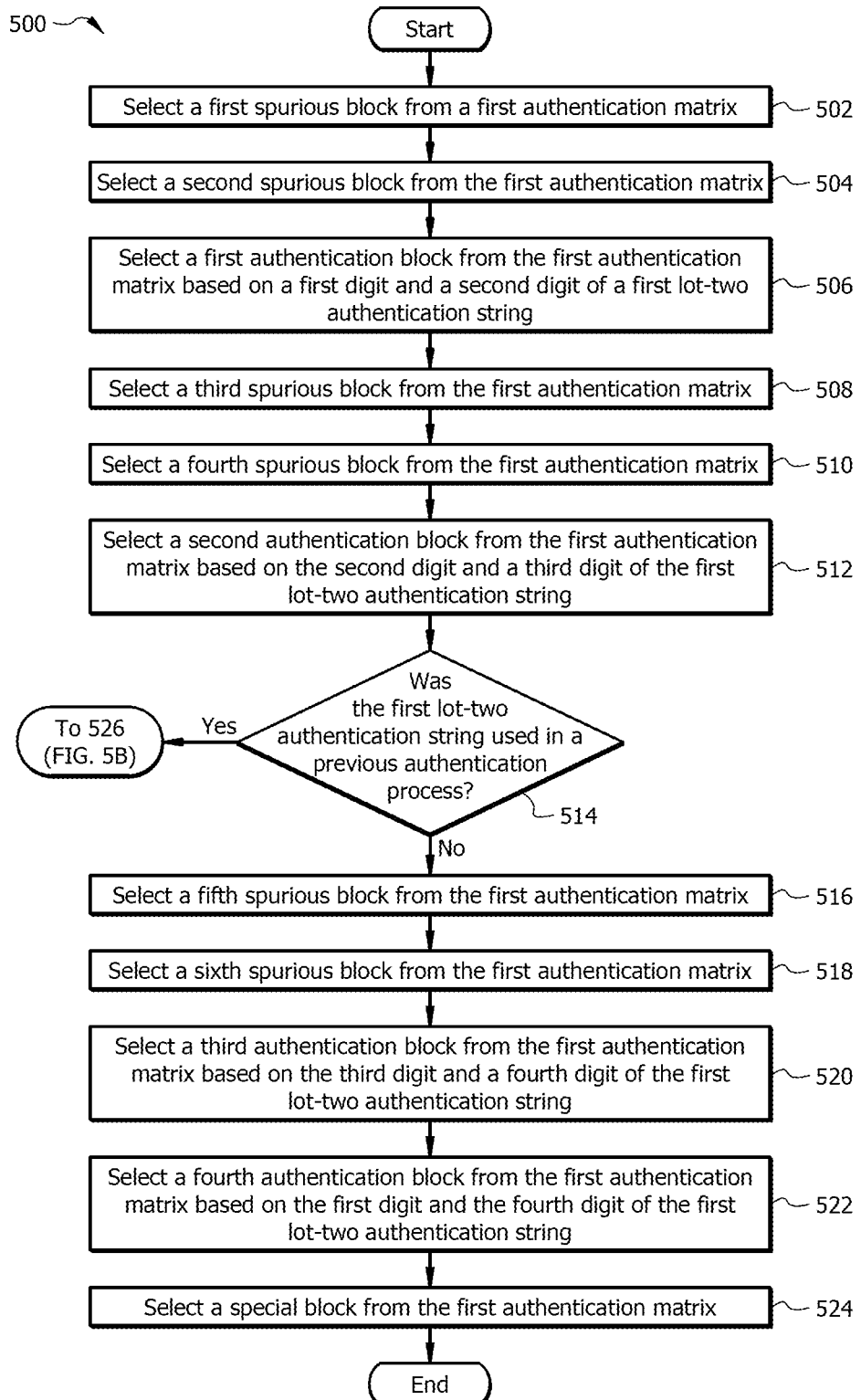
FIGS. 5A and 5B illustrate an example operational flow of a block selection process for a spinning authentication matrix.
Figure 5B:
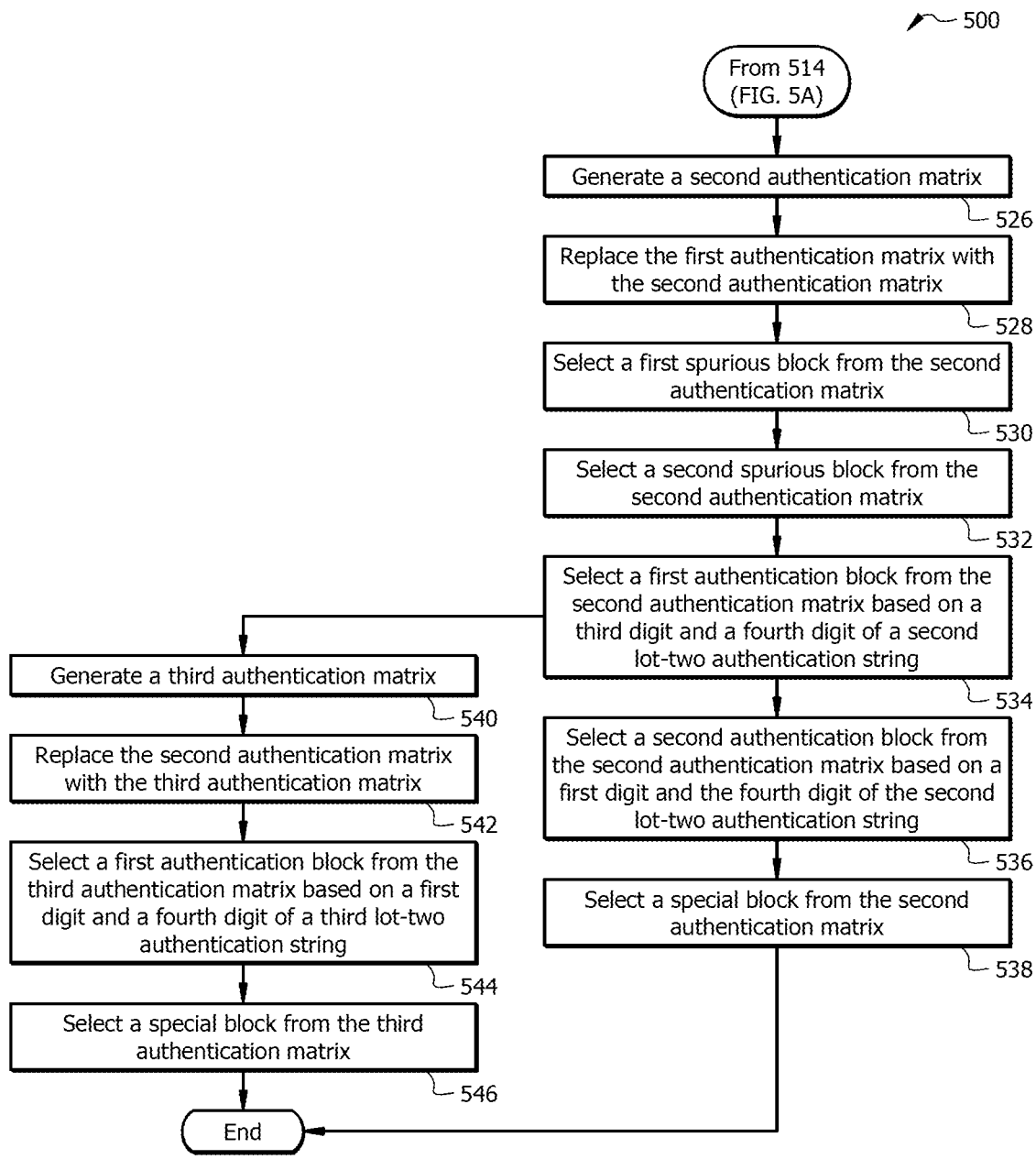

FIGS. 5A and 5B illustrate an example flowchart of a method 500 for a block selection process for a spinning authentication matrix. Modifications, additions, or omissions may be made to method 500. Method 500 may include more, fewer, or other operations. For example, operations may be performed in parallel or in any suitable order. For example, one or more operations of method 500 may be implemented, at least in part, in the form of software instructions (e.g., software instructions 126 and/or 188 of FIG. 1), stored on non-transitory, tangible, computer-readable medium (e.g., memories 124 and/or 186 of FIG. 1) that when executed by one or more processors (e.g., processors 120 and/or 182 of FIG. 1) may cause the one or more processors to perform operations 502-546. Method 500 is described below with reference to FIGS. 1, 2A, 2B, and 2C.

Method 500 describes a first block selection process that selects a plurality of spurious blocks 208-1, 208-2, 208-3, 208-4, 214-1 and 214-2, a plurality of authentication blocks 210-1, 210-2, 216-1 and 216-2, and a special block 218 from a plurality of blocks 206a and 206b of authentication matrices 200a and 200b (see FIG. 2B) and a second block selection process that selects a plurality of spurious blocks 208-1, 208-2, 208-3, 208-4, 214-1 and 214-2, a plurality of authentication blocks 210-1, 210-2, 216-1 and 220-1, and a special block 222 from a plurality of blocks 206a, 206b and 206c of authentication matrices 200a, 200b and 200c (see FIG. 2C). Since authentication matrices 200a, 200b, and 200c are changing during the block selection process, a combination of the authentication matrices 200a, 200b, and 200c may be also referred to a spinning authentication matrix.

The plurality of spurious blocks 208-1, 208-2, 208-3, 208-4, 214-1 and 214-2 are illustrated as shaded with a "dotted" pattern, the plurality of authentication blocks 210-1, 210-2, 216-1, 216-2 and 220-1 are illustrated as shaded with a "grid" pattern, and the special blocks 218 and 222 are illustrated as shaded with a "diagonal stripe" pattern in FIGS. 2A and 2B. The plurality of spurious blocks 208-1, 208-2, 208-3, 208-4, 214-1 and 214-2, and the plurality of authentication blocks 210-1, 210-2, 216-1 and 216-2 are selected according to a block selection sequence 110a (see FIG. 1). The plurality of spurious blocks 208-1, 208-2, 208-3, 208-4, 214-1 and 214-2, and a plurality of authentication blocks 210-1, 210-2, 216-1 and 220-1 are selected according to the block selection sequence 110a. In the illustrated embodiment, the block selection sequence 110a comprises a sequence of "spurious block, spurious block, authentication block, spurious block, spurious block, authentication block, spurious block, spurious block, authentication block, authentication block." In the illustrated embodiments, 6 spurious block and 4 authentication blocks are selected. In other embodiments, the number of spurious blocks and the number of authentication blocks may be chosen according to security requirements of the authentication process.

The plurality of authentication blocks 210-1, 210-2, 216-1 and 216-2 are selected according to two of the lot-two authentication strings 108c that corresponds to the lot-one authentication string 108b of the user 104, with a first one of the lot-two authentication strings 108c being any of the lot-two authentication strings 108c and a second one of the lot-two authentication strings 108c being any of the lot-two authentication strings 108c different from the first one of the lot-two authentication strings 108c (see FIG. 2B). In the illustrated embodiment, the first one of the lot-two authentication strings 108c is a 4-digit PIN comprising 5678 and the second one of the lot-two authentication strings 108c is a 4-digit PIN comprising 9013.

The plurality of authentication blocks 210-1, 210-2, 216-1 and 220-1 are selected according to three of the lot-two authentication strings 108c that corresponds to the lot-one authentication string 108b of the user 104, with a first one of the lot-two authentication strings 108c being any of the lot-two authentication strings 108c, a second one of the lot-two authentication strings 108c being any of the lot-two authentication strings 108c different from the first one of the lot-two authentication strings 108c, and a third one of the lot-two authentication strings 108c being any of the lot-two authentication strings 108c different from the first one of the lot-two authentication strings 108c and the second one of the lot-two authentication strings 108c (see FIG. 2C). In the illustrated embodiment, the first one of the lot-two authentication strings 108c is a 4-digit PIN comprising 5678, the second one of the lot-two authentication strings 108c is a 4-digit PIN comprising 9013, and the third one of the lot-two authentication strings 108*c* is a 4-digit PIN comprising 8124.

Method 500 starts with operation 502, where the processor 120 of the authentication management system 118 (see FIG. 1) selects a first spurious block 208-1 of a first authentication matrix 200*a* (see FIGS. 2A-2C). In the illustrated embodiment, the first authentication matrix 200*a* is a 10-by-10 matrix comprising the plurality of blocks 206*a*. The plurality of rows include a plurality of row labels 202*a* and the plurality of columns include a plurality of column labels 204*a*. The row labels 202*a* and the column labels 204*a* comprise a sequence of integer numbers in a range from 0 to 9. Each block 206*a* of the authentication matrix 200*a* may include a multi-digit alphanumeric string, such as a 9-digit alphanumeric string, for example. In certain embodiments, the user device 106, in response to instructions received from the user 104, may send an instruction 116 to the processor 120 of the authentication management system 118 to select the first spurious block 208-1. The first spurious block 208-1 may be selected at random. In the illustrated embodiment, the first spurious block 208-1 is a block 206*a* that has a row label "0" and a column label "0."

At operation 504, the processor 120 of the authentication management system 118 selects a second spurious block 208-2 of the first authentication matrix 200*a*. In certain embodiments, the user device 106, in response to instructions received from the user 104, may send an instruction 116 to the processor 120 of the authentication management system 118 to select the second spurious block 208-2. The second spurious block 208-2 may be selected at random. In the illustrated embodiment, the second spurious block 208-2 is a block 206*a* that has a row label "6" and a column label "0."

At operation 506, the processor 120 of the authentication management system 118 selects a first authentication block 210-1 of the first authentication matrix 200*a* based on a first digit and a second digit of a first one of the lot-two authentication strings 108*c*. In certain embodiments, the user device 106, in response to instructions received from the user 104, may send an instruction 116 to the processor 120 of the authentication management system 118 to select the first authentication block 210-1. In the illustrated embodiment when the first one of the lot-two authentication strings 108*c* is a 4-digit PIN comprising 5678, the first authentication block 210-1 is a block 206*a* that has a row label equal to the first digit "5" and a column label equal to the second digit "6."

At operation 508, the processor 120 of the authentication management system 118 selects a third spurious block 208-3 of the first authentication matrix 200*a*. In certain embodiments, the user device 106, in response to instructions received from the user 104, may send an instruction 116 to the processor 120 of the authentication management system 118 to select the third spurious block 208-3. The third spurious block 208-3 may be selected at random. In the illustrated embodiment, the third spurious block 208-3 is a block 206*a* that has a row label "3" and a column label "1."

At operation 510, the processor 120 of the authentication management system 118 selects a fourth spurious block 208-4 of the first authentication matrix 200*a*. In certain embodiments, the user device 106, in response to instructions received from the user 104, may send an instruction 116 to the processor 120 of the authentication management system 118 to select the fourth spurious block 208-4. The fourth spurious block 208-4 may be selected at random. In the illustrated embodiment, the fourth spurious block 208-4 is a block 206*a* that has a row label "4" and a column label "6."

At operation 512, the processor 120 of the authentication management system 118 selects a second authentication block 210-2 of the first authentication matrix 200*a* based on the second digit and a third digit of the first one of the lot-two authentication strings 108*c*. In certain embodiments, the user device 106, in response to instructions received from the user 104, may send an instruction 116 to the processor 120 of the authentication management system 118 to select the second authentication block 210-2. In the illustrated embodiment when the first one of the lot-two authentication strings 108*c* is a 4-digit PIN comprising 5678, the second authentication block 210-2 is a block 206*a* that has a row label equal to the second digit "6" and a column label equal to the third digit "7."

At operation 514, the processor 120 of the authentication management system 118 determines if the first one of the lot-two authentication strings 108*c* was used in a previous authentication process. In response to determining at operation 514 that the first one of the lot-two authentication strings 108*c* was not used in the previous authentication process, method 500 continues to operation 516.

At operation 516, the processor 120 of the authentication management system 118 selects a fifth spurious block 208-5 of the first authentication matrix 200*a*. In certain embodiments, the user device 106, in response to instructions received from the user 104, may send an instruction 116 to the processor 120 of the authentication management system 118 to select the fifth spurious block 208-5. The fifth spurious block 208-5 may be selected at random. In the illustrated embodiment, the fifth spurious block 208-5 is a block 206*a* that has a row label "8" and a column label "6."

At operation 518, the processor 120 of the authentication management system 118 selects a sixth spurious block 208-6 of the first authentication matrix 200*a*. In certain embodiments, the user device 106, in response to instructions received from the user 104, may send an instruction 116 to the processor 120 of the authentication management system 118 to select the sixth spurious block 208-6. The sixth spurious block 208-6 may be selected at random. In the illustrated embodiment, the sixth spurious block 208-6 is a block 206*a* that has a row label "5" and a column label "9."

At operation 520, the processor 120 of the authentication management system 118 selects a third authentication block 210-3 of the first authentication matrix 200*a* based on the third digit and a fourth digit of the first one of the lot-two authentication strings 108*c*. In certain embodiments, the user device 106, in response to instructions received from the user 104, may send an instruction 116 to the processor 120 of the authentication management system 118 to select the third authentication block 210-3. In the illustrated embodiment when the first one of the lot-two authentication strings 108*c* is a 4-digit PIN comprising 5678, the third authentication block 210-3 is a block 206*a* that has a row label equal to the third digit "7" and a column label equal to the fourth digit "8."

At operation 522, the processor 120 of the authentication management system 118 selects a fourth authentication block 210-4 of the first authentication matrix 200*a* based on the first digit and the fourth digit of the first one of the lot-two authentication strings 108*c*. In certain embodiments, the user device 106, in response to instructions received from the user 104, may send an instruction 116 to the processor 120 of the authentication management system 118 to select the fourth authentication block 210-4. In the illustrated embodiment when the first one of the lot-two authentication strings 108c is a 4-digit PIN comprising 5678, the fourth authentication block 210-4 is a block 206a that has a row label equal to the fourth digit "8" and a column label equal to the first digit "5."

At operation 524, the processor 120 of the authentication management system 118 selects a special block 212 of the first authentication matrix 200a. In certain embodiments, the user device 106, in response to instructions received from the user 104 according to a special block code 110c, may send an instruction 116 to the processor 120 of the authentication management system 118 to select the special block 212 according to the special block code 110c. In the illustrated embodiment, the special block 212 is a block 206a that has a row label "9" and a column label "0." After performing operation 524, method 500 ends. In certain embodiments, operation 524 may be omitted. In such embodiments, method 500 ends after performing operation 522.

In response to determining at operation 514 that the first one of the lot-two authentication strings 108c was used in the previous authentication process, method 500 continues to operation 526. At operation 526, the processor 120 of the authentication management system 118 generates a second authentication matrix 200b (see FIGS. 2B and 2C). In the illustrated embodiment, the second authentication matrix 200b is a 10-by-10 matrix comprising the plurality of blocks 206b. The plurality of rows include a plurality of row labels 202b and the plurality of columns include a plurality of column labels 204b. The row labels 202b and the column labels 204b comprise a sequence of integer numbers in a range from 0 to 9. Each block 206b of the authentication matrix 200b may include a multi-digit alphanumeric string, such as a 9-digit alphanumeric string, for example. In certain embodiments, the second authentication matrix 200b is different from the first authentication matrix 200a, such that the blocks 206b are different from the blocks 206a. At operation 528, the processor 120 of the authentication management system 118 replaces the first authentication matrix 200a with the second authentication matrix 200b.

At operation 530, the processor 120 of the authentication management system 118 selects a first spurious block 214-1 of the second authentication matrix 200b. In certain embodiments, the user device 106, in response to instructions received from the user 104, may send an instruction 116 to the processor 120 of the authentication management system 118 to select the first spurious block 214-1. The first spurious block 214-1 may be selected at random. In the illustrated embodiment, the first spurious block 214-1 is a block 206b that has a row label "8" and a column label "6."

At operation 532, the processor 120 of the authentication management system 118 selects a second spurious block 214-2 of the second authentication matrix 200b. In certain embodiments, the user device 106, in response to instructions received from the user 104, may send an instruction 116 to the processor 120 of the authentication management system 118 to select the second spurious block 214-2. The second spurious block 214-2 may be selected at random. In the illustrated embodiment, the second spurious block 214-2 is a block 206b that has a row label "5" and a column label "9."

At operation 534, the processor 120 of the authentication management system 118 selects a first authentication block 216-1 of the second authentication matrix 200b based on a third digit and a fourth digit of the second one of the lot-two authentication strings 108c. In certain embodiments, the user device 106, in response to instructions received from the user 104, may send an instruction 116 to the processor 120 of the authentication management system 118 to select the first authentication block 216-1. In the illustrated embodiment when the second one of the lot-two authentication strings 108c is a 4-digit PIN comprising 9013, the first authentication block 216-1 is a block 206b that has a row label equal to the third digit "1" and a column label equal to the fourth digit "3."

In certain embodiments, after performing the operation 534, method 500 continues to operation 536. At operation 536, the processor 120 of the authentication management system 118 selects a second authentication block 216-2 of the second authentication matrix 200b based on a first digit and the fourth digit of the second one of the lot-two authentication strings 108c. In certain embodiments, the user device 106, in response to instructions received from the user 104, may send an instruction 116 to the processor 120 of the authentication management system 118 to select the second authentication block 216-2. In the illustrated embodiment when the second one of the lot-two authentication strings 108c is a 4-digit PIN comprising 9013, the second authentication block 216-2 is a block 206b that has a row label equal to the fourth digit "3" and a column label equal to the first digit "9."

At operation 538, the processor 120 of the authentication management system 118 selects a special block 218 of the second authentication matrix 200b. In certain embodiments, the user device 106, in response to instructions received from the user 104 according to a special block code 110c, may send an instruction 116 to the processor 120 of the authentication management system 118 to select the special block 218 according to the special block code 110c. In the illustrated embodiment, the special block 218 is a block 206b that has a row label "9" and a column label "1." After performing operation 538, method 500 ends. In certain embodiments, operation 538 may be omitted. In such embodiments, method 500 ends after performing operation 536.

In certain embodiments, after performing the operation 534, method 500 continues to operation 540. At operation 540, the processor 120 of the authentication management system 118 generates a third authentication matrix 200c (see FIG. 2C). In the illustrated embodiment, the third authentication matrix 200c is a 10-by-10 matrix comprising the plurality of blocks 206c. The plurality of rows include a plurality of row labels 202c and the plurality of columns include a plurality of column labels 204c. The row labels 202c and the column labels 204c comprise a sequence of integer numbers in a range from 0 to 9. Each block 206c of the third authentication matrix 200c may include a multi-digit alphanumeric string, such as a 9-digit alphanumeric string, for example. In certain embodiments, the third authentication matrix 200c is different from the second authentication matrix 200b, such that the blocks 206c are different from the blocks 206b. At operation 542, the processor 120 of the authentication management system 118 replaces the second authentication matrix 200b with the third authentication matrix 200c.

At operation 544, the processor 120 of the authentication management system 118 selects a first authentication block 220-1 of the third authentication matrix 200c based on a first digit and a fourth digit of the third one of the lot-two authentication strings 108c. In certain embodiments, the user device 106, in response to instructions received from the user 104, may send an instruction 116 to the processor 120 of the authentication management system 118 to select the first authentication block 220-1. In the illustrated embodiment when the third one of the lot-two authentication strings 108c is a 4-digit PIN comprising 8124, the first authentication block 220-1 is a block 206c that has a row label equal to the fourth digit "4" and a column label equal to the first digit "8."

At operation 546, the processor 120 of the authentication management system 118 selects a special block 222 of the third authentication matrix 200c. In certain embodiments, the user device 106, in response to instructions received from the user 104 according to a special block code 110c, may send an instruction 116 to the processor 120 of the authentication management system 118 to select the special block 222 according to the special block code 110c. In the illustrated embodiment, the special block 222 is a block 206c that has a row label "8" and a column label "2." After performing operation 546, method 500 ends. In certain embodiments, operation 546 may be omitted. In such embodiments, method 500 ends after performing operation 544.

In the illustrated embodiment, operation 514 is performed after operation 512. In other embodiments, operation 514 may be performed after any of operations 506, 508, 510, 516, 518, 520, and 522. In the illustrated embodiment, operation 540 is performed after operation 534. In other embodiments, operation 540 may be performed after any of operations 530, 532, and 536.

By using an authentication matrix to select spurious and authentication blocks a malicious user may fail to distinguish between authentication blocks and the spurious blocks and to obtain full authentication information of the user (such as, for example, one or more lot-two authentication strings) even if a keystroke logging malware or a screen capturing malware is installed on the user device by the malicious user. Furthermore, by employing the spinning authentication matrix, the authentication security of users is further improved, since the malicious user may fail to correlate selected blocks with one or more lot-two authentication strings used for selecting the spurious and authentication blocks and to identify the one or more lot-two authentication strings used during the block selection process.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:
   a memory configured to store a first user profile for a first user, wherein the first user profile comprises:
      a first static password associated with the first user;
      one or more lot-one authentication strings associated with the first user, wherein each lot-one authentication string of the first user comprises a multi-digit alphanumeric string;
      one or more lot-two authentication strings associated with each lot-one authentication string of the first user, wherein each lot-two authentication string of the first user comprises a multi-digit alphanumeric string;
      a first block selection sequence associated with the first user, wherein the first block selection sequence is a sequence according to which the first user is supposed to select one or more authentication blocks and one or more spurious blocks from an authentication matrix, and wherein the one or more authentication blocks are selected based on a lot-two authentication string of the first user; and
      hashes of dynamic passwords, wherein each dynamic password comprises a combination of the first static password, a respective lot-one authentication string of the first user, and one or more authentication blocks selected based on a respective lot-two authentication string associated with the respective lot-one authentication string of the first user; and
   a processor communicatively coupled to the memory and configured to:
      receive a hash of the first static password and a hash of a first lot-one authentication string from a first user device of the first user;
      perform an initial validation of the first user based at least in part upon the hash of the first static password and the hash of the first lot-one authentication string; and
      in response to determining that the first user is validated:
         generate a first authentication matrix, wherein the first authentication matrix comprises a first plurality of blocks arranged in a first plurality of rows and a first plurality of columns, the first plurality of rows comprising a first plurality of row labels and the first plurality of columns comprising a first plurality of column labels;
         perform a first block selection process to select a first plurality of spurious blocks and a first plurality of authentication blocks from the first authentication matrix, wherein performing the first block selection process comprises:
            selecting a first spurious block from the first authentication matrix;
            selecting a second spurious block from the first authentication matrix;
            selecting a first authentication block from the first authentication matrix based on a first digit and a second digit of a first lot-two authentication string associated with the first lot-one authentication string, wherein the first authentication block is a block of the first authentication matrix with a row label equal to the first digit of the first lot-two authentication string and a column label equal to the second digit of the first lot-two authentication string;
selecting a third spurious block from the first authentication matrix;
selecting a fourth spurious block from the first authentication matrix;
selecting a second authentication block from the first authentication matrix based on the second digit and a third digit of the first lot-two authentication string, wherein the second authentication block is a block of the first authentication matrix with a row label equal to the second digit of the first lot-two authentication string and a column label equal to the third digit of the first lot-two authentication string;
selecting a fifth spurious block from the first authentication matrix;
selecting a sixth spurious block from the first authentication matrix;
selecting a third authentication block from the first authentication matrix based on the third digit and a fourth digit of the first lot-two authentication string, wherein the third authentication block is a block of the first authentication matrix with a row label equal to the third digit of the first lot-two authentication string and a column label equal to the fourth digit of the first lot-two authentication string; and
selecting a fourth authentication block from the first authentication matrix based on the first digit and the fourth digit of the first lot-two authentication string, wherein the fourth authentication block is a block of the first authentication matrix with a row label equal to the fourth digit of the first lot-two authentication string and a column label equal to the first digit of the first lot-two authentication string;
determine if the first plurality of spurious blocks and the first plurality of authentication blocks are selected according to the first block selection sequence associated with the first user; and
in response to determining that the first plurality of spurious blocks and the first plurality of authentication blocks are selected according to the first block selection sequence associated with the first user:
generate a first dynamic password by combining the first static password, the first lot-one authentication string and the first plurality of authentication blocks;
generate a hash of the first dynamic password; and
in response to determining that the hash of the first dynamic password matches a hash of a dynamic password that is stored in the first user profile of the first user, authenticate the first user.

2. The system of claim 1, wherein:
the memory is further configured to store a second user profile of a second user, wherein the second user profile comprises:
a second static password associated with the second user;
one or more lot-one authentication strings associated with the second user, wherein each lot-one authentication string of the second user comprises a multi-digit alphanumeric string;
one or more lot-two authentication strings associated with each lot-one authentication string of the second user, wherein each lot-two authentication string of the second user comprises a multi-digit alphanumeric string; and
single-use codes associated with the second user, wherein each single-use code comprises information for selecting respective spurious blocks and respective authentication blocks from an authentication matrix; and
the processor is further configured to:
receive a hash of the second static password and a hash of a second lot-one authentication string from a second user device of the second user;
perform an initial validation of the second user based on the hash of the second static password and the hash of the second lot-one authentication string; and
in response to determining that the second user is validated:
generate a second authentication matrix, wherein the second authentication matrix comprises a second plurality of blocks arranged in a second plurality of rows and a second plurality of columns, the second plurality of rows comprising a second plurality of row labels and the second plurality of columns comprising a second plurality of column labels;
perform a second block selection process to select a second plurality of spurious blocks and a second plurality of authentication blocks from the second authentication matrix;
determine if the second plurality of spurious blocks and the second plurality of authentication blocks are selected according to a single-use code stored in the second user profile of the second user; and
in response to determining that the second plurality of spurious blocks and the second plurality of authentication blocks are selected according to the single-use code stored in the second user profile of the second user:
authenticate the second user;
determine that the second user forgot at least one lot-two authentication string associated with the second user;
discard all lot-two authentication string associated with the second user;
generate new lot-two authentication strings for the second user; and
send the new lot-two authentication strings to the second user.

3. The system of claim 1, wherein the processor is further configured to:
select a special block from the first authentication matrix;
determine if the special block indicates that the first user is using a public device or a private device; and
in response to determining that the first user is using the public device:
discard the first lot-two authentication string;
generate a new lot-two authentication string for the first user; and
send the new lot-two authentication string to the first user.

4. The system of claim 1, wherein the processor is further configured to:
select a special block from the first authentication matrix; and
determine if the special block indicates that an authentication confirmation is needed for the first user; and in response to determining that the authentication confirmation is needed for the first user, perform the authentication confirmation for the first user.

5. The system of claim 1, wherein combining the first static password, the first lot-one authentication string and the first plurality of authentication blocks comprises concatenating a string of the first static password, a string of the first lot-one authentication string and strings of the first plurality of authentication blocks.

6. The system of claim 1, wherein the processor is further configured to, in response to determining that the hash of the first dynamic password does not match the hash of the dynamic password that is stored in the first user profile of the first user, send a notification to the first user device of the first user that authentication is not successful.

7. The system of claim 1, wherein the processor is further configured to, in response to determining that the first plurality of spurious blocks and the first plurality of authentication blocks are not selected according to the first block selection sequence associated with the first user:
  generate a second authentication matrix; and
  perform a second block selection process to select a second plurality of spurious blocks and a second plurality of authentication blocks from the second authentication matrix.

8. A method comprising:
receiving a hash of a first static password and a hash of a first lot-one authentication string from a first user device of a first user;
performing an initial validation of the first user based at least in part upon the hash of the first static password and the hash of the first lot-one authentication string; and
in response to determining that the first user is validated:
  generating a first authentication matrix, wherein the first authentication matrix comprises a first plurality of blocks arranged in a first plurality of rows and a first plurality of columns, the first plurality of rows comprising a first plurality of row labels and the first plurality of columns comprising a first plurality of column labels;
  performing a first block selection process to select a first plurality of spurious blocks and a first plurality of authentication blocks from the first authentication matrix, wherein performing the first block selection process comprises:
    selecting a first spurious block from the first authentication matrix;
    selecting a second spurious block from the first authentication matrix;
    selecting a first authentication block from the first authentication matrix based on a first digit and a second digit of a first lot-two authentication string associated with the first lot-one authentication string, wherein the first authentication block is a block of the first authentication matrix with a row label equal to the first digit of the first lot-two authentication string and a column label equal to the second digit of the first lot-two authentication string;
    selecting a third spurious block from the first authentication matrix;
    selecting a fourth spurious block from the first authentication matrix;
    selecting a second authentication block from the first authentication matrix based on the second digit and a third digit of the first lot-two authentication string, wherein the second authentication block is a block of the first authentication matrix with a row label equal to the second digit of the first lot-two authentication string and a column label equal to the third digit of the first lot-two authentication string;
    selecting a fifth spurious block from the first authentication matrix;
    selecting a sixth spurious block from the first authentication matrix;
    selecting a third authentication block from the first authentication matrix based on the third digit and a fourth digit of the first lot-two authentication string, wherein the third authentication block is a block of the first authentication matrix with a row label equal to the third digit of the first lot-two authentication string and a column label equal to the fourth digit of the first lot-two authentication string; and
    selecting a fourth authentication block from the first authentication matrix based on the first digit and the fourth digit of the first lot-two authentication string, wherein the fourth authentication block is a block of the first authentication matrix with a row label equal to the fourth digit of the first lot-two authentication string and a column label equal to the first digit of the first lot-two authentication string;
  determining if the first plurality of spurious blocks and the first plurality of authentication blocks are selected according to a first block selection sequence stored in a first user profile of the first user; and
  in response to determining that the first plurality of spurious blocks and the first plurality of authentication blocks are selected according to the first block selection sequence stored in the first user profile of the first user:
    generating a first dynamic password by combining the first static password, the first lot-one authentication string and the first plurality of authentication blocks;
    generating a hash of the first dynamic password; and
    in response to determining that the hash of the first dynamic password matches a hash of a dynamic password that is stored in the first user profile of the first user, authenticating the first user.

9. The method of claim 8, further comprising:
receiving a hash of a second static password and a hash of a second lot-one authentication string from a second user device of a second user;
performing an initial validation of the second user based on the hash of the second static password and the hash of the second lot-one authentication string; and
in response to determining that the second user is validated:
  generating a second authentication matrix, wherein the second authentication matrix comprises a second plurality of blocks arranged in a second plurality of rows and a second plurality of columns, the second plurality of rows comprising a second plurality of row labels and the second plurality of columns comprising a second plurality of column labels;
  performing a second block selection process to select a second plurality of spurious blocks and a second plurality of authentication blocks from the second authentication matrix;

determining if the second plurality of spurious blocks and the second plurality of authentication blocks are selected according to a single-use code associated with the second user; and in response to determining that the second plurality of spurious blocks and the second plurality of authentication blocks are selected according to the single-use code associated with the second user:
  authenticating the second user;
  determining that the second user forgot at least one lot-two authentication string associated with the second user;
  discarding all lot-two authentication string associated with the second user;
  generating new lot-two authentication strings for the second user; and
  sending the new lot-two authentication strings to the second user.

10. The method of claim 8, further comprising:
selecting a special block from the first authentication matrix;
determining if the special block indicates that the first user is using a public device or a private device; and
in response to determining that the first user is using the public device:
  discarding the first lot-two authentication string;
  generating a new lot-two authentication string for the first user; and
  sending the new lot-two authentication string to the first user.

11. The method of claim 8, further comprising:
selecting a special block from the first authentication matrix; and
determining if the special block indicates that an authentication confirmation is needed for the first user; and
in response to determining that the authentication confirmation is needed for the first user, performing the authentication confirmation for the first user.

12. The method of claim 8, wherein combining the first static password, the first lot-one authentication string and the first plurality of authentication blocks comprises concatenating a string of the first static password, a string of the first lot-one authentication string and strings of the first plurality of authentication blocks.

13. The method of claim 8, further comprising, in response to determining that the hash of the first dynamic password does not match the hash of the dynamic password that is stored in the first user profile of the first user, sending a notification to the first user device of the first user that authentication is not successful.

14. The method of claim 8, further comprising, in response to determining that the first plurality of spurious blocks and the first plurality of authentication blocks are not selected according to the first block selection sequence associated with the first user:
  generating a second authentication matrix; and
  performing a second block selection process to select a second plurality of spurious blocks and a second plurality of authentication blocks from the second authentication matrix.

15. A non-transitory computer-readable medium storing instructions that, when executed by one or more processors, cause the one or more processors to:
  receive a hash of a first static password and a hash of a first lot-one authentication string from a first user device of a first user;
  perform an initial validation of the first user based at least in part upon the hash of the first static password and the hash of the first lot-one authentication string; and
  in response to determining that the first user is validated:
    generate a first authentication matrix, wherein the first authentication matrix comprises a first plurality of blocks arranged in a first plurality of rows and a first plurality of columns, the first plurality of rows comprising a first plurality of row labels and the first plurality of columns comprising a first plurality of column labels;
    perform a first block selection process to select a first plurality of spurious blocks and a first plurality of authentication blocks from the first authentication matrix, wherein performing the first block selection process comprises:
      selecting a first spurious block from the first authentication matrix;
      selecting a second spurious block from the first authentication matrix;
      selecting a first authentication block from the first authentication matrix based on a first digit and a second digit of a first lot-two authentication string associated with the first lot-one authentication string, wherein the first authentication block is a block of the first authentication matrix with a row label equal to the first digit of the first lot-two authentication string and a column label equal to the second digit of the first lot-two authentication string;
      selecting a third spurious block from the first authentication matrix;
      selecting a fourth spurious block from the first authentication matrix;
      selecting a second authentication block from the first authentication matrix based on the second digit and a third digit of the first lot-two authentication string, wherein the second authentication block is a block of the first authentication matrix with a row label equal to the second digit of the first lot-two authentication string and a column label equal to the third digit of the first lot-two authentication string;
      selecting a fifth spurious block from the first authentication matrix;
      selecting a sixth spurious block from the first authentication matrix;
      selecting a third authentication block from the first authentication matrix based on the third digit and a fourth digit of the first lot-two authentication string, wherein the third authentication block is a block of the first authentication matrix with a row label equal to the third digit of the first lot-two authentication string and a column label equal to the fourth digit of the first lot-two authentication string; and
      selecting a fourth authentication block from the first authentication matrix based on the first digit and the fourth digit of the first lot-two authentication string, wherein the fourth authentication block is a block of the first authentication matrix with a row label equal to the fourth digit of the first lot-two authentication string and a column label equal to the first digit of the first lot-two authentication string;
    determine if the first plurality of spurious blocks and the first plurality of authentication blocks are selected according to a first block selection sequence stored in a first user profile of the first user; and in response to determining that the first plurality of spurious blocks and the first plurality of authentication blocks are selected according to the first block selection sequence stored in the first user profile of the first user:

generate a first dynamic password by combining the first static password, the first lot-one authentication string and the first plurality of authentication blocks;

generate a hash of the first dynamic password; and in response to determining that the hash of the first dynamic password matches a hash of a dynamic password that is stored in the first user profile of the first user, authenticate the first user.

16. The non-transitory computer-readable medium of claim 15, wherein the instructions, when executed by the one or more processors, further cause the one or more processors to:

receive a hash of a second static password and a hash of a second lot-one authentication string from a second user device of a second user;

perform an initial validation of the second user based on the hash of the second static password and the hash of the second lot-one authentication string; and in response to determining that the second user is validated:

generate a second authentication matrix, wherein the second authentication matrix comprises a second plurality of blocks arranged in a second plurality of rows and a second plurality of columns, the second plurality of rows comprising a second plurality of row labels and the second plurality of columns comprising a second plurality of column labels;

perform a second block selection process to select a second plurality of spurious blocks and a second plurality of authentication blocks from the second authentication matrix;

determine if the second plurality of spurious blocks and the second plurality of authentication blocks are selected according to a single-use code associated with the second user; and in response to determining that the second plurality of spurious blocks and the second plurality of authentication blocks are selected according to the single-use code associated with the second user:

authenticate the second user;

determine that the second user forgot at least one lot-two authentication string associated with the second user;

discard all lot-two authentication string associated with the second user;

generate new lot-two authentication strings for the second user; and send the new lot-two authentication strings to the second user.

17. The non-transitory computer-readable medium of claim 15, wherein the instructions, when executed by the one or more processors, further cause the one or more processors to:

select a special block from the first authentication matrix;

determine if the special block indicates that the first user is using a public device or a private device; and in response to determining that the first user is using the public device:

discard the first lot-two authentication string;

generate a new lot-two authentication string for the first user; and send the new lot-two authentication string to the first user.

18. The non-transitory computer-readable medium of claim 15, wherein the instructions, when executed by the one or more processors, further cause the one or more processors to:

select a special block from the first authentication matrix; and determine if the special block indicates that an authentication confirmation is needed for the first user; and in response to determining that the authentication confirmation is needed for the first user, perform the authentication confirmation for the first user.

19. The non-transitory computer-readable medium of claim 15, wherein the instructions, when executed by the one or more processors, further cause the one or more processors to, in response to determining that the hash of the first dynamic password does not match the hash of the dynamic password that is stored in the first user profile of the first user, sending a notification to the first user device of the first user that authentication is not successful.

20. The non-transitory computer-readable medium of claim 15, wherein the instructions, when executed by the one or more processors, further cause the one or more processors to, in response to determining that the first plurality of spurious blocks and the first plurality of authentication blocks are not selected according to the first block selection sequence associated with the first user:

generate a second authentication matrix; and perform a second block selection process to select a second plurality of spurious blocks and a second plurality of authentication blocks from the second authentication matrix.

* * * * *